July 31, 1951 — T. P. HALL — 2,562,490
CONVERTIBLE CAR-AIRPLANE
Filed June 30, 1945 — 11 Sheets-Sheet 1
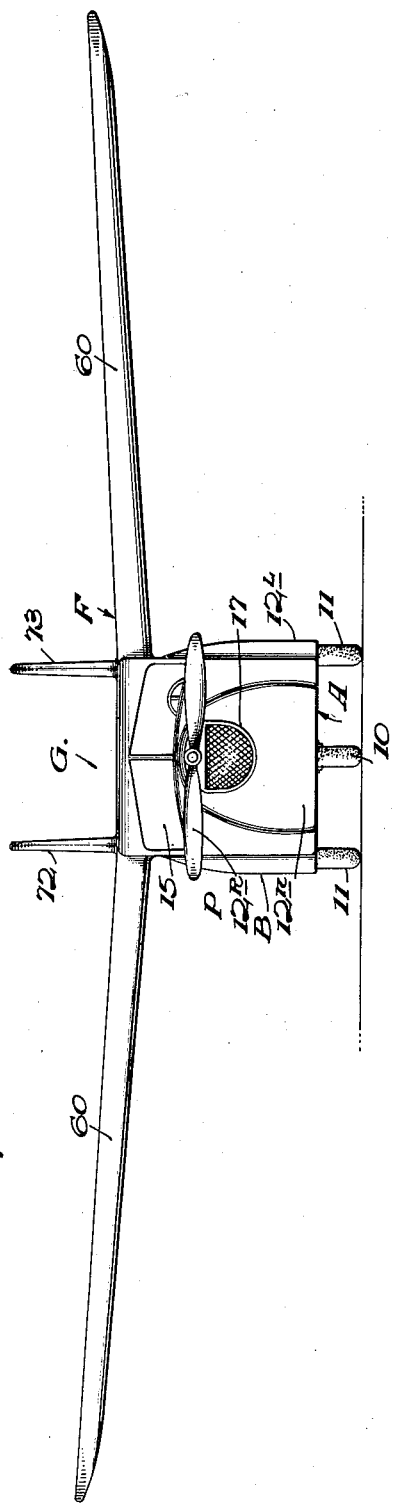
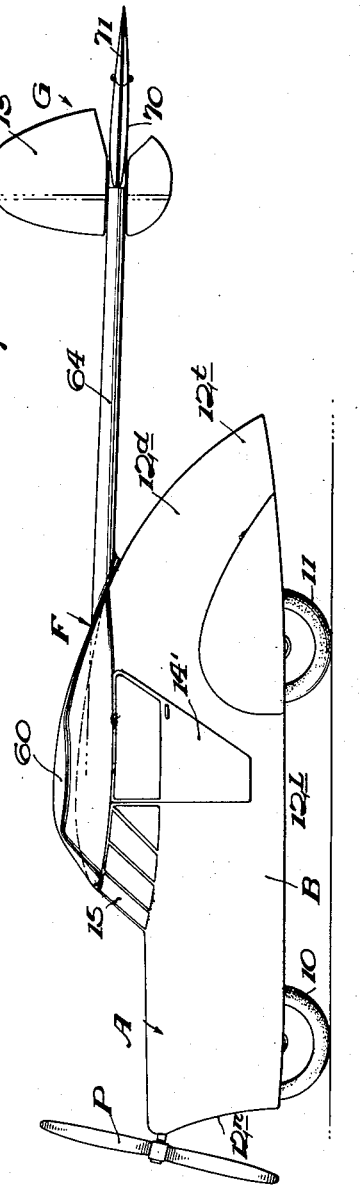
Inventor
Theodore P. Hall
By Peck & Peck
Attorneys

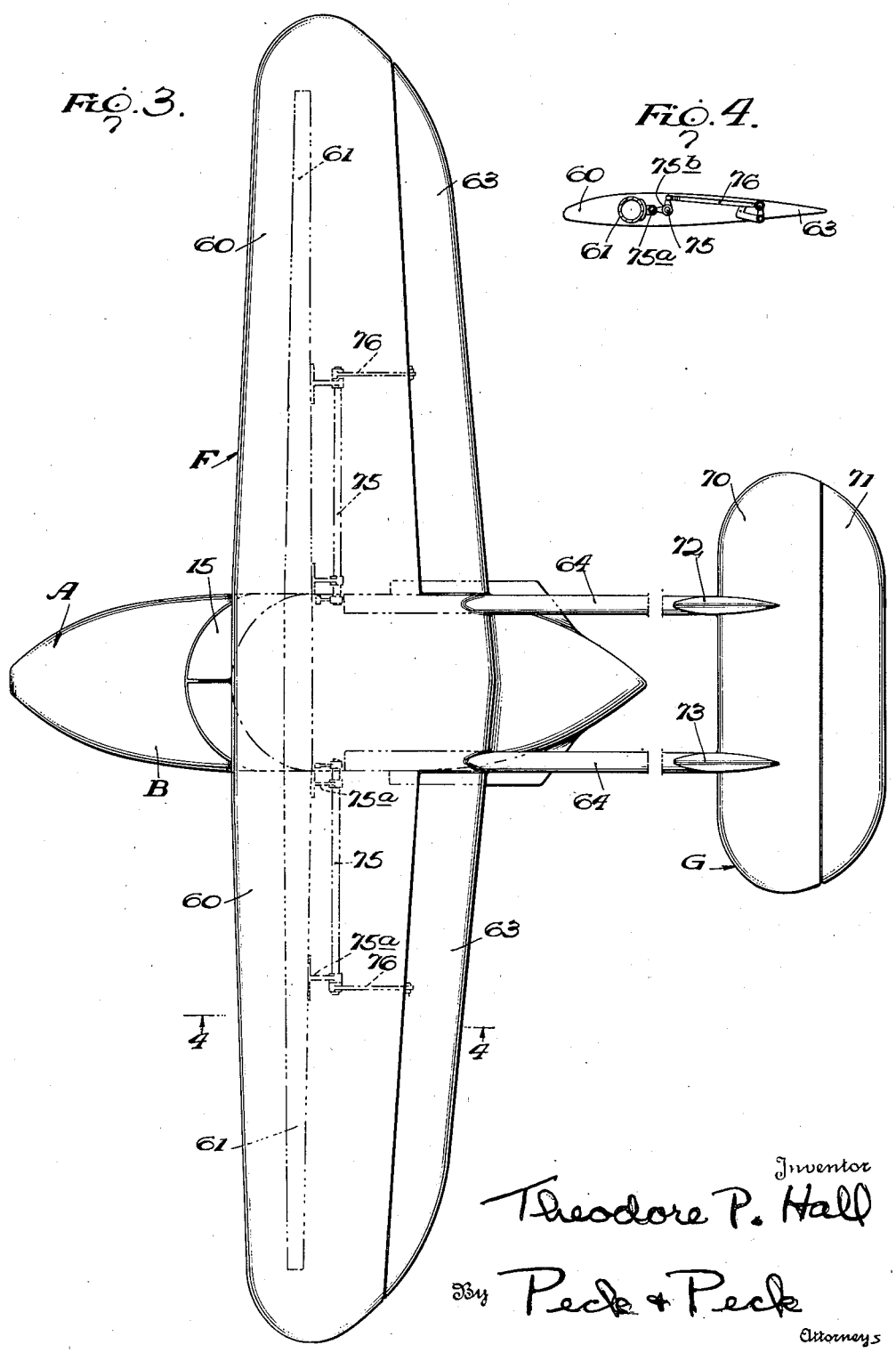

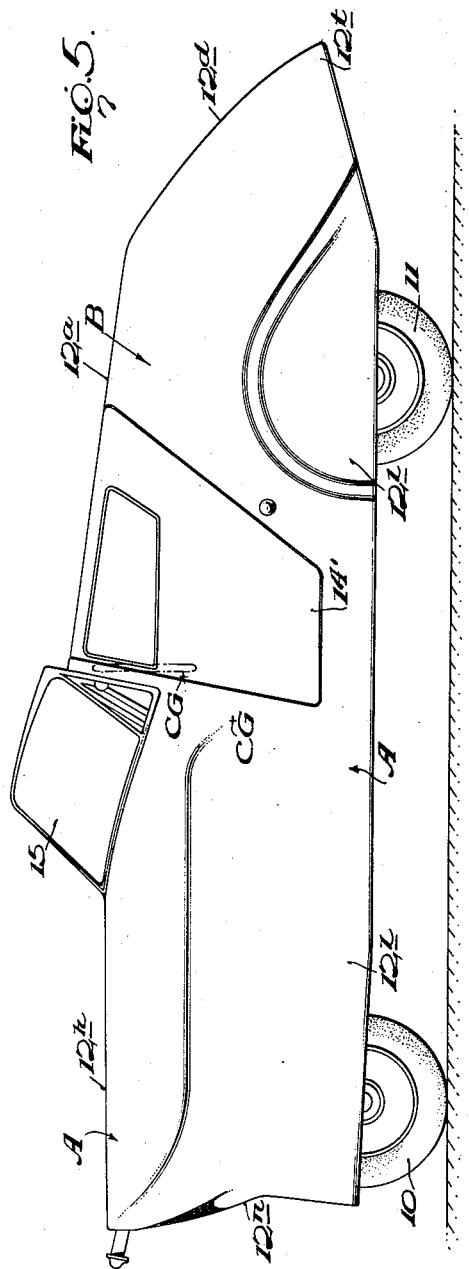
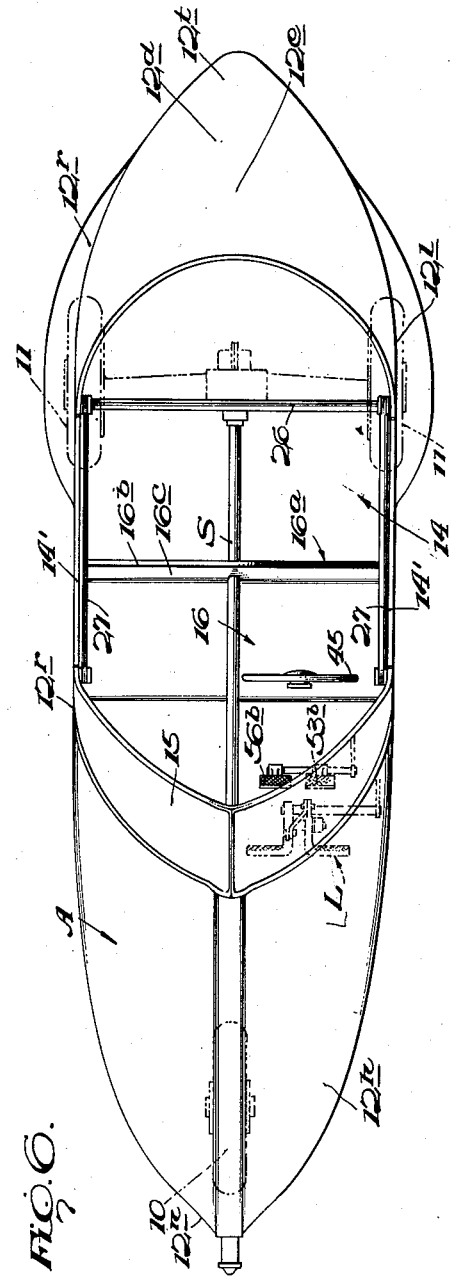

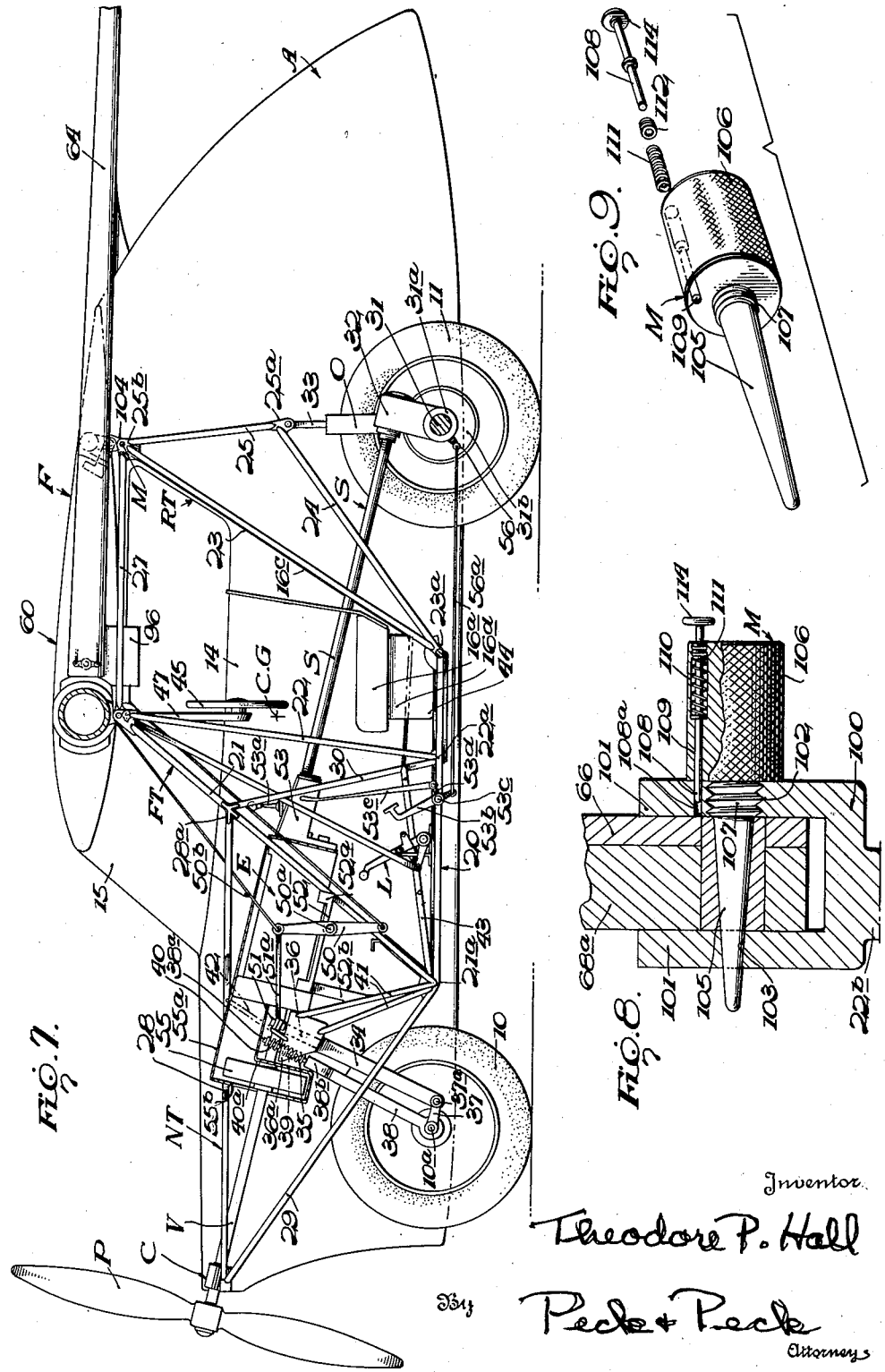

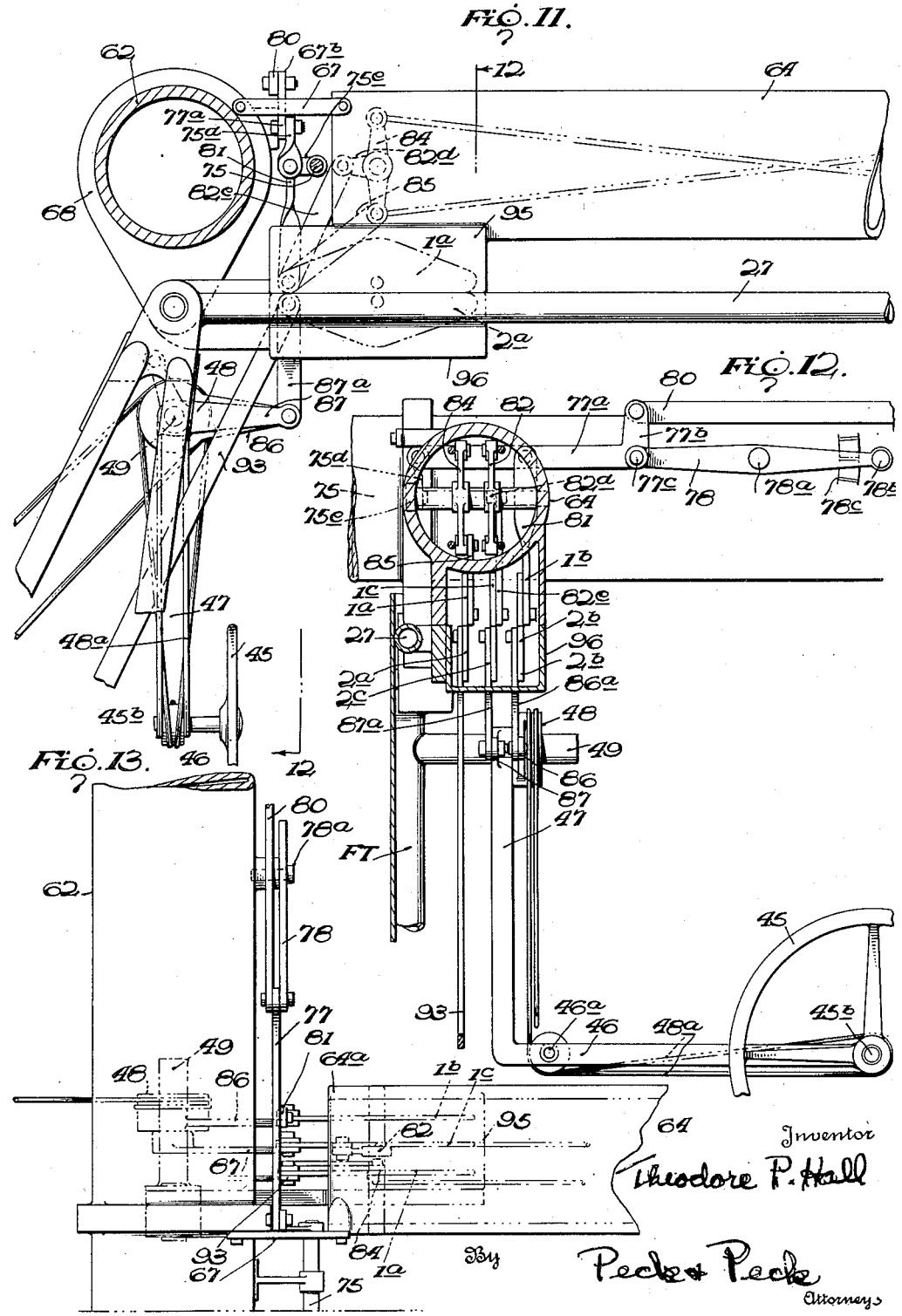

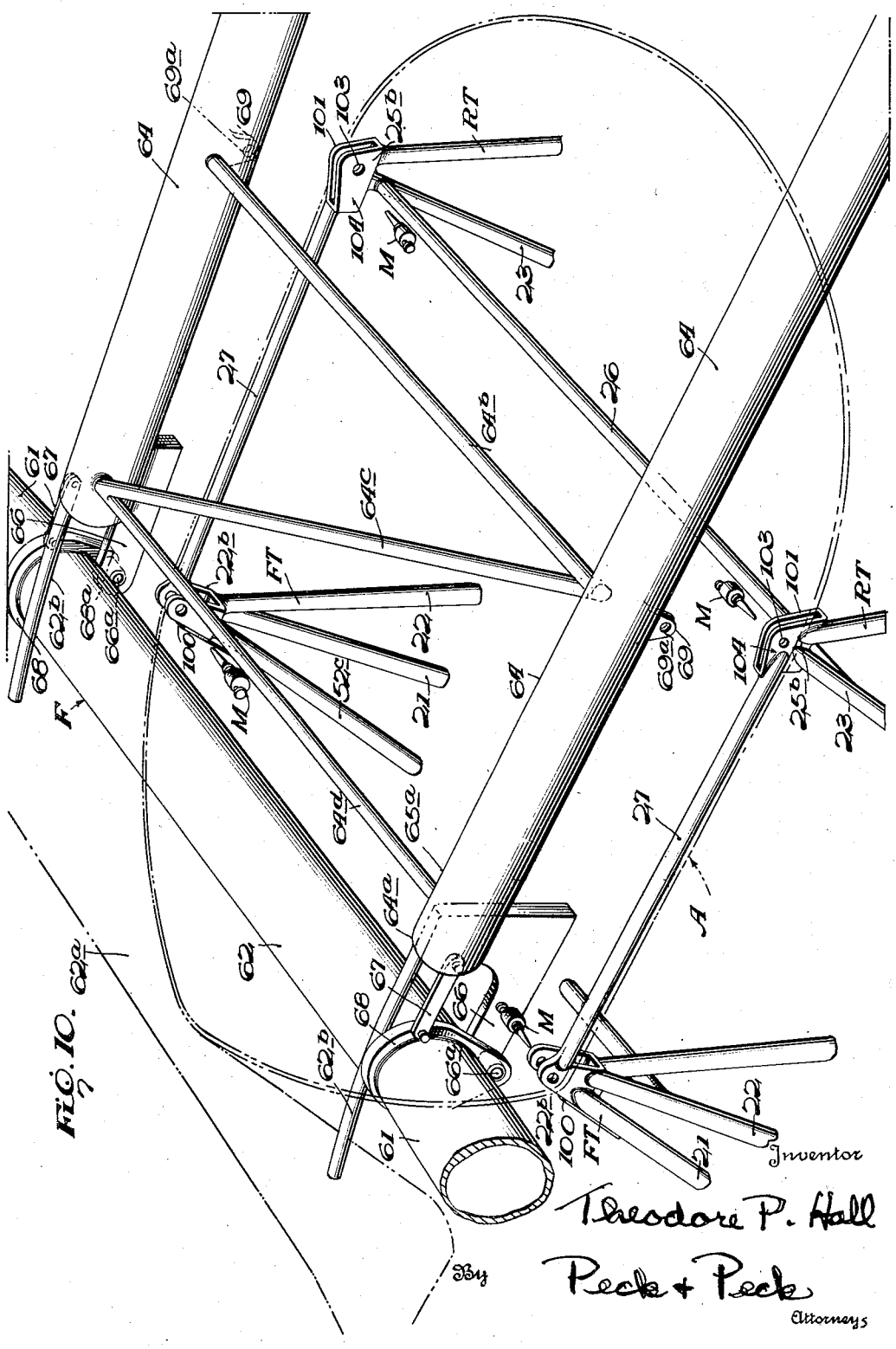

July 31, 1951  T. P. HALL  2,562,490
CONVERTIBLE CAR-AIRPLANE
Filed June 30, 1945  11 Sheets-Sheet 7
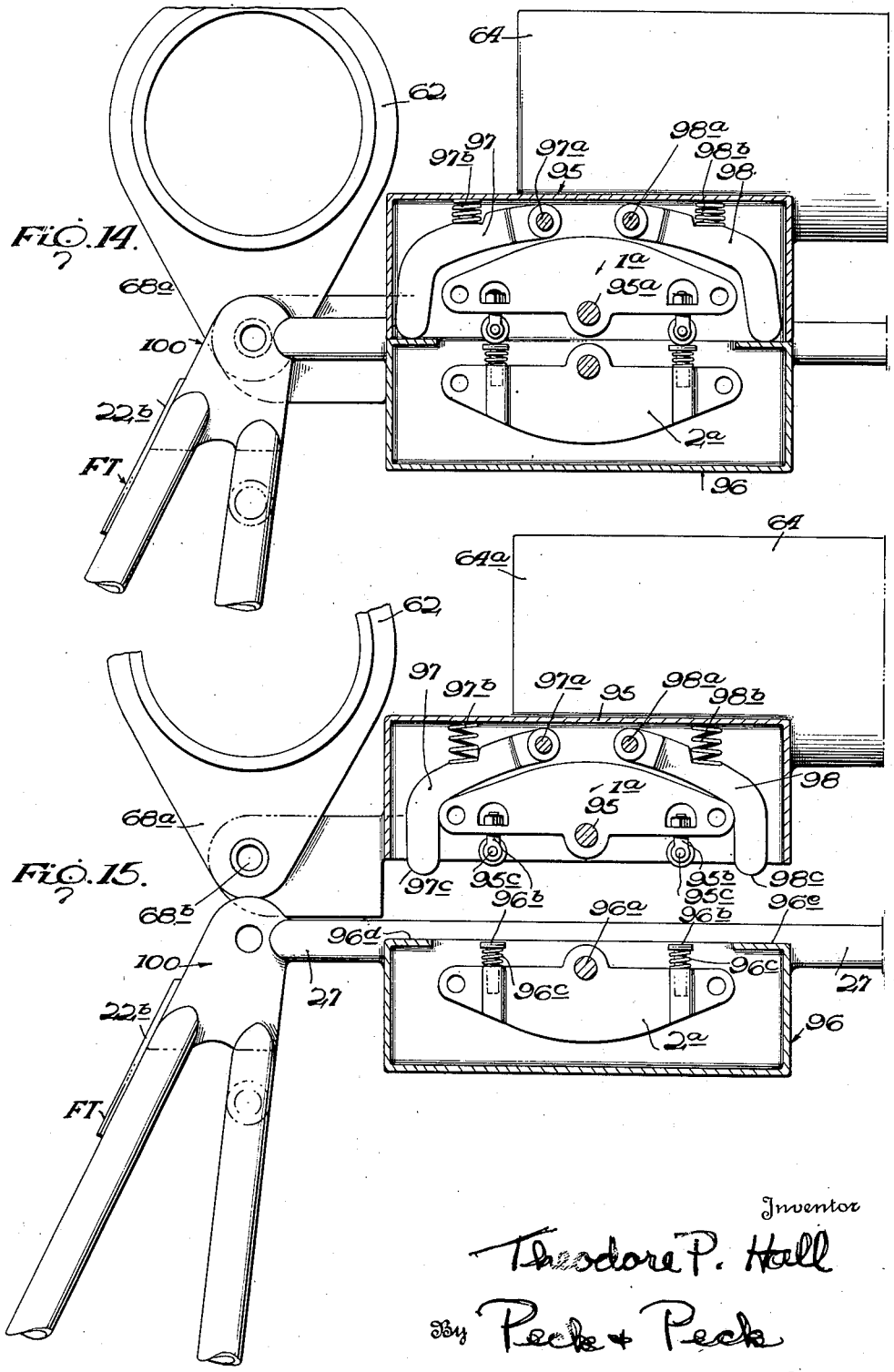

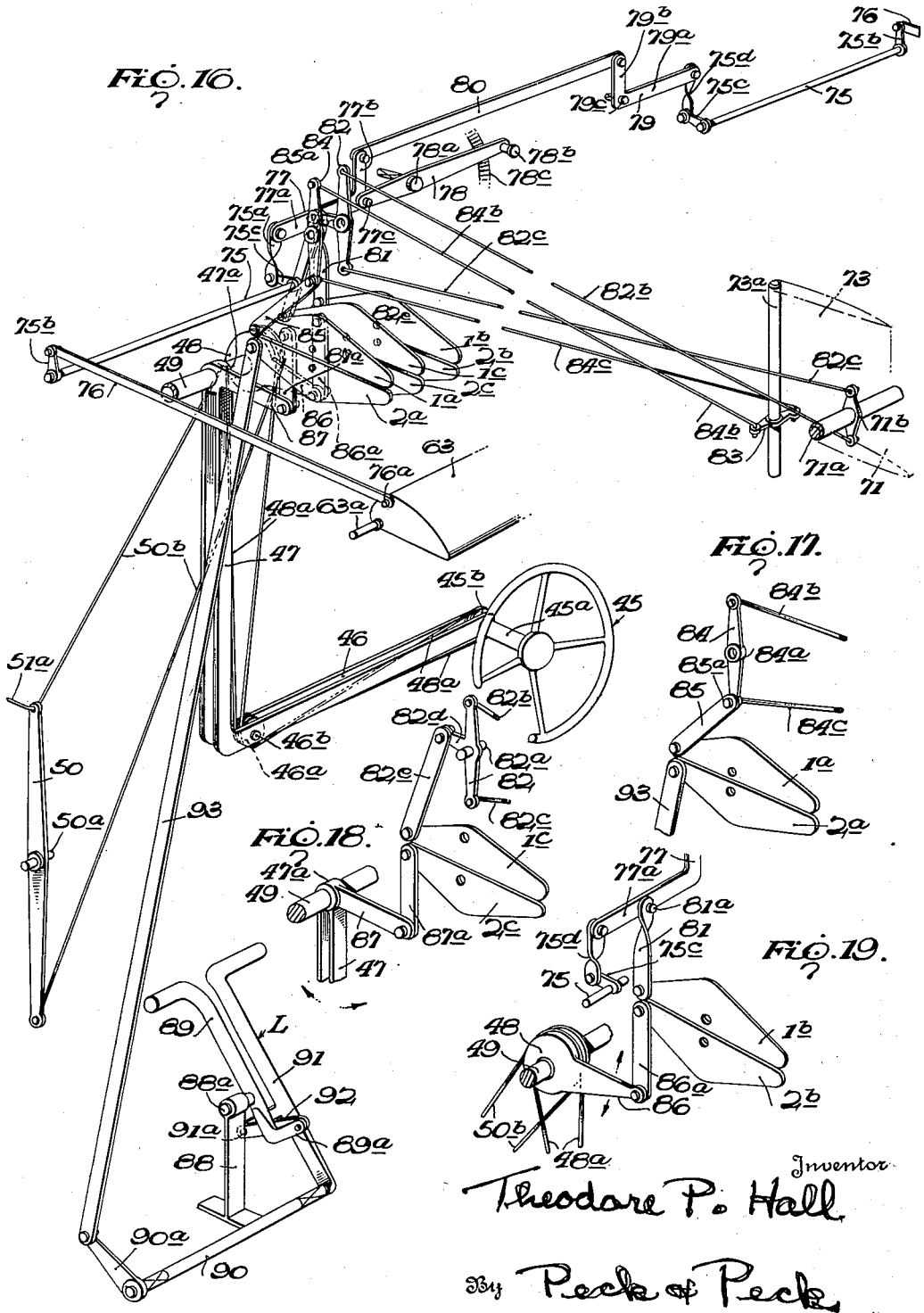

July 31, 1951 — T. P. HALL — 2,562,490
CONVERTIBLE CAR-AIRPLANE
Filed June 30, 1945 — 11 Sheets-Sheet 9

Inventor
Theodore P. Hall
By Peck & Peck
Attorneys

July 31, 1951 T. P. HALL 2,562,490
CONVERTIBLE CAR-AIRPLANE
Filed June 30, 1945 11 Sheets-Sheet 10

Inventor
Theodore P. Hall
By Peck & Peck
Attorneys

July 31, 1951     T. P. HALL     2,562,490
CONVERTIBLE CAR-AIRPLANE

Filed June 30, 1945     11 Sheets-Sheet 11

Inventor
Theodore P. Hall
By Peck & Peck
Attorneys

Patented July 31, 1951

2,562,490

UNITED STATES PATENT OFFICE 2,562,490

CONVERTIBLE CAR-AIRPLANE

Theodore P. Hall, San Diego, Calif.

Application June 30, 1945, Serial No. 602,538

19 Claims. (Cl. 244—2)

1

This invention relates to certain improvements in convertible car-airplanes, and the nature and objects of the invention will be readily recognized and understood by those skilled in the arts to which the invention relates, from the following detailed description and explanation of the accompanying drawings illustrating what I at present consider to be the preferred embodiments or mechanical and aerodynamic expressions of my invention from among various other forms, designs, arrangements, constructions, combinations and modifications of which the invention is capable within the broad spirit and scope thereof.

My present invention is primarily and basically directed toward those general types or classes of convertible or dual-purpose vehicles intended to function and to be operated for flight as an airplane and intended to function and to be operated on the ground as a road vehicle, automobile or so-called "car."

One of the problems inherent in such types or classes of convertible or dual-purpose vehicles, and a problem which must be satisfactorily solved in order to provide such a vehicle which will be of a character to have practical utility and be commercially feasible, is to obtain a practical and efficient coordinated combination between the elements and structure of the vehicle necessary for its functioning and operation as an airplane and the elements and structure of the vehicle necessary for the functioning and operation thereof as an automobile or roadable vehicle or car and to so carry out and effect the combination that, the performance, efficiency and practical character of the vehicle as an airplane will not be substantially interfered with or sacrificed in order to obtain practical performance and efficiency for the vehicle when it is converted for operation as an automobile or car, and the performance, efficiency and practical character of the vehicle as an automobile or car will not be materially interfered with or sacrificed in order to obtain practical and efficient performance for the vehicle when converted for operation and use as an airplane.

Prior designs and arrangements heretofore proposed for such convertible or dual-purpose types or classes of vehicles generally have not satisfactorily solved and overcome the basic problem of obtaining a practical and efficient coordinated combination between the elements and structure necessary for the functioning and operation of the vehicle as an airplane and the elements and structure necessary for the functioning and operation thereof as an automobile or car, in that, due to inherent factors and features of construction and arrangement, such prior designs and arrangements are usually found to be either of a character in which the vehicle is more efficient and more nearly practical as an airplane, but is seriously inefficient and impractical to the point of being purely a "makeshift" as a road vehicle or car, or, if practically usable and reasonably efficient as an automobile or car, the vehicle is extremely inefficient and impractical, and even in some instances unsafe, as an airplane.

A basic factor from among others, contributing to the above referred to problem in those types of this general class of convertible or dual-purpose vehicles in which that portion of the structure which is to provide the road vehicle, automobile or car, is also to be utilized and is to form and to function as the landing gear and body or fuselage for the vehicle when the vehicle is converted to provide the airplane, arises from the difficulties of adapting such structure, both mechanically and structurally, as well as functionally, to meet the different structural, operating and use conditions presented by the landing gear of an airplane, from the structural, operating and use conditions presented by the running gear of a road vehicle of the self-propelled or automotive type, such as an automobile or car.

The essential factors and characteristics designed into and embodied in the landing gear, or combined landing gear and body or fuselage of conventional types of airplanes, especially when such landing gear is of the so-called tricycle or directionally stable types, necessary to render such landing gear capable of practically and efficiently meeting the conditions to which the landing gear is subjected in operation and use of the airplane, are not only different from the factors and characteristics necessary and required for the running gear and body of a self-propelled road vehicle, automobile or car, in order to obtain practical roadability and efficient operation for the running gear and body, but if embodied as basic factors and characteristics in the running gear of an automobile or car, will materially reduce roadability and operting efficiency of the automobile or car to such an extent as to substantially reduce the practical utility of the vehicle as an automobile or car.

Heretofore, in proposed designs and arrangements of such convertible or dual-purpose vehicles of the type in which a portion or unit of the vehicle is designed and intended to provide and to be operated and used as an automobile or car, and is also intended and required to provide and function as the airplane landing gear when the vehicle is converted for operation and use as an airplane, it is usually found that the factors, features and characteristics necessary to provide a practical and efficient road vehicle comparable to the conventional types of automobile or car have been either destroyed or eliminated, or their effectiveness and efficiency substantially sacrificed and reduced, in order to obtain the essential factors and characteristics for the structure to enable it to practically and efficiently function as an airplane landing gear when the vehicle is converted from an automobile or car to an airplane, with the result that, that portion of the structure or vehicle intended to perform and to operate as an automobile or car is at best a more or less "makeshift," and is generally without practical utility for normal or conventional operation and use as an automobile or car, at least in comparison with the efficiency, performance, and utility of the conventional automobile or car designed primarily and solely for surface or road operation and use.

Another basic factor contributing to this general problem presented by the convertible or dual-purpose types of vehicles, as aforesaid, is the necessity for coordination of the aerodynamic or flight elements of the vehicle by which the vehicle is converted from an automobile or car to an airplane, with those elements and structure of the vehicle which convert the vehicle to form the automobile or car, in such a manner that such flight elements will not be compromised structurally or functionally to meet the design and structural requirements of the automobile or car forming structure and elements to an extent such that the efficiency of the aerodynamic or flight elements of the vehicle is reduced to a point at which the vehicle, when converted to form and to be operated as an airplane, has such an inefficient performance, both aerodynamically and structurally, as to be without practical utility from the production and/or the flight performance standpoint.

A factor which also adds to the general problem with those types of convertible or dual purpose vehicles in which the vehicle is converted from an automobile or car to an airplane by adding aerodynamic or flight elements to the automobile or car forming structure or unit of the vehicle, and by converting the vehicle from an airplane to an automobile or car by detaching and removing such aerodynamic or flight elements, is the necessity for providing mechanically practical and functionally efficient operating systems for the aerodynamic control surfaces for the flight elements making up the flight unit of a convertible or dual-purpose vehicle of such type, together with the requirement for practically and efficiently providing for the ready attachment and detachment of such control systems from and to operative association in the vehicle when the vehicle is converted to an airplane by the addition of the flight unit and when it is converted to an automobile or car by detachment and removal of the flight unit; and the further requirement for providing such control systems with properly located control operating points in that portion or unit of the vehicle which forms the automobile or car, in positions readily available and accessible to the driver-pilot of the vehicle when it is converted to an airplane but without interference with or obstruction of the controls utilized for operating the automobile or car when the vehicle has been converted to an automobile or car by the detachment and removal of the aerodynamic or flight unit therefrom.

Also, among the basic factors encountered in the general problem inherent in the convertible car-airplane types of vehicles, are those involved in the provision of a power source for propelling the vehicle on the road when converted to an automobile or car and of a power source for propelling the vehicle in flight when the vehicle is converted to form and provide an airplane, with particular reference to the problems encountered and the conditions to be overcome if separate power sources are to be utilized for propelling the vehicle as a car and for propelling the vehicle in flight as an airplane, or to the problems and conditions developed if a single source of power only is to be employed for propelling the vehicle both when converted to a car and when converted to an airplane; the use of such a single source of power specifically involving the critical factors of power plant location, and relative positioning of the power or drive mechanism from the single power source to the propulsive elements, that is, to the driving or road wheels of the automobile or car when the vehicle is converted to road use, and to the propeller or other propulsive means for the vehicle when the vehicle is converted for flight as an airplane.

Various other factors and conditions are involved in and contribute to the general problem referred to hereinbefore, and in addition and aside from such general problem there are various other related or collateral problems which are encountered and must be satisfactorily overcome in attaining the objective of producing a practical and efficient convertible car-airplane of the general type or class above identified, and such other factors of the general or major problem, and such other related and collateral problems will be developed by and will be apparent from the disclosures and explanations hereinafter set forth, of an example of a convertible car-airplane embodying and illustrating the application of the principles and various features of my present invention.

In carrying out this general object of the invention in accordance with the principles of the invention, convertible or dual-purpose vehicles embodying the invention in the preferred forms thereof (a convertible or dual-purpose vehicle of the invention being sometimes generally referred to herein for purposes of convenience and not by way of limitation, as a "convertible car-airplane" or "car-airplane") are basically characterized and typified by a design and arrangement in which the fundamental and primary aerodynamic or flight elements, such as the wings, tail unit and aerodynamic control surfaces, which are utilized to form and convert the vehicle from an automobile or car into an airplane, are designed and arranged to form a flight unit which is detachable and removable as a unit to convert the vehicle from an airplane into a generally conventional type of automobile or car for normal and usual road operation and use, and which is attachable as a unit to the automobile or car forming portion of the dual-purpose vehicle or car-airplane, in order to convert the automobile or car to an airplane for flight operation and use.

However, in connection with the above basic characterization of the invention in its preferred forms, it is to be noted that certain of the features of design, arrangement and construction embodied in and presented by the invention, are not necessarily limited to inclusion in or use with such basically characterized preferred forms of convertible car-airplanes of the invention, but are intended for and adapted to embodiment with other types and forms of dual-purpose vehicles or convertible car-airplanes, while as to some of such features they are adapted and intended for use with aircraft generally whether or not of the so-called convertible car-airplane type all of which will be more fully referred to and pointed out in connection with the more detailed explanation and description of such features appearing hereinafter.

One of the major features of a convertible car-airplane embodying the principles of my present invention, resides in the provision of a single assembly or unit of the vehicle structure to form a conventional type of automobile or car when the vehicle is converted to road use by removal of the aerodynamic or flight unit from the automobile or car forming unit of the vehicle structure, and to form the body or fuselage and landing gear of the convertible car-airplane when it is converted for flight operation and use as an airplane by the mounting and attachment of the flight units of the vehicle structure to the automobile or car forming unit or assembly; and which automobile or car forming unit when separated from the aerodynamic or flight units, itself provides a complete, ready to operate self-propelled automotive road vehicle, automobile or car having basic characteristics and features which give the automobile or car adequate wheel base and width of tread, substantially enclosed running gear, engine mounting and location, drive mechanisms and operating controls, so that the automobile or car formed and provided by such self-contained unit will have satisfactory roadability, including riding, operating and steering characteristics, such as to render the automobile unit capable of a general performance as and comparable to an automotive road vehicle of the conventional automobile types.

The invention is further characterized and featured in a preferred embodiment thereof, by the use of a single source of power, such for example, as the usual internal combustion or other type engine power unit, for propelling the vehicle as an airplane and also for propelling the vehicle as an automobile or car, and by the location and mounting of such single power unit in the automobile or car forming unit of the vehicle, so that, when the vehicle has been converted to an airplane for flight operation and use, such power unit provides the source of power for driving the propulsive means, such as a propeller or propellers, for propelling the airplane in flight, with the location of the power unit so coordinated with the remaining structure and elements of the vehicle when converted to an airplane, that the required center of gravity location for the airplane is attained, and the propeller or propellers for propelling the airplane in flight may be located in the most advantageous positions for aerodynamic and propulsive efficiency as well as to permit the utilization of a mechanically and structurally simple and efficient drive from the power unit to the propeller or propellers, yet which power unit location is also such that when the airplane is converted to an automobile or car by removal of the flight units from the automobile or car forming unit, the power unit will be located in such coordination and combination with and relative to the automobile or car unit as to be in an efficient and practical location and position for functioning as an automobile power plant, to thereby contribute to the practical and efficient performance, operation and handling of the automobile or car as a generally conventional automobile designed primarily and solely for road use.

Another feature of the invention resides in the mounting and location of a single power unit for driving the convertible car-airplane when converted to an automobile or car and for propelling the car-airplane when converted to an airplane, in such a manner that a tractor type of propeller may be positioned at the forward or nose end of the automobile or car unit of the car-airplane and utilized for propelling the car-airplane in flight when converted to an airplane, and by which mounting and location of the power unit a direct drive from the power shaft of the power unit to such tractor propeller may be employed, with such power shaft capable of being utilized as the propeller shaft for such a tractor propeller, if desired; and further by which power plant location and mounting, a generally conventional automobile drive mechanism may be provided from the power unit to the driving wheels of the automobile or car forming unit of the convertible car-airplane of a character and so located that conventional types of automotive transmission and clutch means may be operatively associated and combined with such drive mechanism for controlling the power delivered by the power plant to the driving wheels, without structural, mechanical or functional interference with the propeller drive from such power unit to the propulsive means for propelling the car-airplane when converted to form an airplane.

A further feature of the invention in connection with the power unit and the driving mechanisms therefrom to the driving wheels of the automobile or car forming unit, and to the propelling means for the vehicle when converted to an airplane by the mounting of the flight unit to the automobile forming unit, is found in the arrangement by which power may be applied to the ground wheels during and to aid in the take-off of the vehicle when the vehicle has been converted to and is being operated for flight as an airplane.

Another feature of the invention is found in the utilization in a convertible car-airplane, of standard or conventional automobile operating controls, including steering wheel, transmission gear shift, clutch pedal, and brake pedal, for the automobile or car unit when the latter is converted to form and for operation and use as a conventional automobile or car, and the utilization of generally standard or conventional pilot operated flight controls, including directional control or steering elements such as pedals, a lateral or roll control element or member, and a pitch control element or member, for the car-airplane when it is converted for flight operation and use as an airplane, with the automobile or car controls and the conventional flight controls located in the automobile or car unit in positions readily accessible to the driver-pilot for ease and comfort of operation and without structural or functional interference between such controls; and in a preferred arrangement with the automobile gear shift, clutch and brake pedals, and the flight controls for direction and for pitch, all being separate and independent control members or elements, but with the steering wheel for the automobile also providing and forming the flight control element for roll or lateral control for the airplane when the vehicle is converted from an automobile to an airplane for flight operation and use.

The invention is further characterized by and a feature thereof resides in the provision of flight control operating systems for the aerodynamic control surfaces of the flight unit, which systems with the flight unit mounted and attached to the automobile or car forming unit to convert the vehicle to an airplane, operatively extend from the flight unit control surfaces to the pilot operated control members located in the automobile or car unit, with those portions or sections of the systems mounted in the flight unit being separably associated or connected with those portions or sections of the system mounted in the automobile or car forming unit, so that the flight unit mounted portions or sections and the automobile or car unit mounted portions or sections of the flight control operating systems are separable from each other when the flight unit is detached and removed from the automobile or car forming unit to convert the vehicle to an airplane for flight operation and use.

A further feature of the invention resides in providing a design and arrangement by which the portions or sections of the control systems mounted in and carried by the flight unit and the portions or sections of the control systems mounted in and carried by the automobile or car forming unit, are automatically associated in operative relation and connection by the mere act of mounting and attaching the flight unit to the automobile or car forming unit, and are automatically separable by the mere act of detaching and removing the flight unit from the car unit; and which arrangement in a preferred form thereof is such that the sections or portions of the flight control systems installed in and carried by the flight unit are automatically returned to and maintained in neutral control positions in order to return and maintain the control surfaces operated thereby in neutral positions when the flight unit is detached and removed from the automobile or car forming unit, so as to avoid damage or injury to the control surfaces during handling and storage of the detached flight unit.

A further feature of the invention is presented by the design and arrangement of the structure of the airplane or car forming unit to provide attachment points for attaching the flight unit, without resulting structural or mechanical complications and without substantially or materially interfering with the basic design, either structurally or as to external shape or contour of the automobile or car forming unit, and by the design and arrangement of attachment points on the flight unit for cooperative association and connection with the attachment points provided by the automobile or car forming unit to attach the flight unit to the car unit; and further to provide efficient and mechanically simple types of connecting and locking members for detachably securing the flight unit attachment points to the automobile or car unit attachment points, in a manner to safely attach and lock the flight unit to the automobile or car forming unit to form the airplane for flight operation and use, while permitting of the flight unit being readily quickly detached from the automobile or car forming unit for removal of the flight unit to convert the automobile or car unit to form a conventional type of automobile for road use.

A feature and a characteristic of the invention is also found in the design and arrangement of the flight unit as consisting essentially of the wings and an outrigged empennage or tail group mounted on spaced booms with the associated boom and wing structures providing the attachment points for the flight unit, and with the tail group in the preferred forms thereof, embodying a twin tail consisting of twin vertical surfaces, one of which provides a directional control surface.

In connection with the aerodynamic or flight elements of the flight unit, a feature of the invention resides in the design and arrangement of a twin tail consisting of vertical surfaces, one of which is fixed and the other of which is laterally displaceable to form a yaw or directional control surface; this feature of the invention not being limited in its use to the particular association of the present example, or to airplanes of the convertible car-airplane type but being adapted to use with airplanes generally of various types.

With the foregoing general objects, features, characteristics and results in view, from among various others, my invention consists in certain novel features in the design and construction of elements and parts and in the arrangements and combinations thereof, all as will be more fully referred to and specified hereinafter.

Referring to the accompanying drawings in which similar reference characters refer to corresponding parts and elements throughout the several figures thereof:

Fig. 1 is a view in front elevation of a convertible car airplane embodying my invention with the flight unit in mounted attached position on the car forming unit and the propeller in mounted operative position on the propeller driveshaft at the forward or nose end of the car forming unit, to convert the vehicle to form and provide an airplane for flight operation and use.

Fig. 2 is a view in side elevation of the car-airplane of Fig. 1.

Fig. 3 is a view in top plan of the car-airplane of Figs. 1 and 2.

Fig. 4 is a detailed view in vertical, transverse section through a wing of the flight unit taken as on the line 4—4 of Fig. 3, and particularly showing the lateral control surface torque tube and operating link therefrom to the control surface.

Fig. 5 is a view in side elevation of the automobile or car forming unit of the form of convertible car airplane of Figs. 1 and 2, with the flight unit and propeller, detached and removed to convert the vehicle to a generally conventional type of automobile.

Fig. 6 is a view in top plan of the automobile or car forming unit of Fig. 5.

Figure 20:
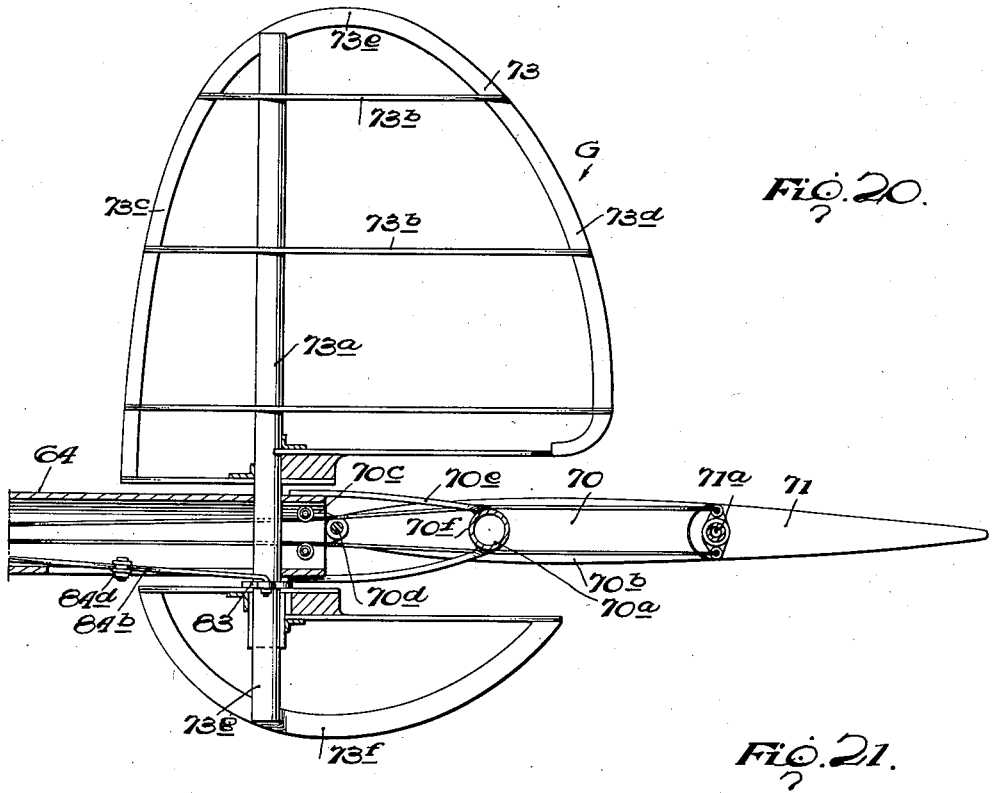

Fig. 7 is a view, partly in side elevation and partly in vertical longitudinal section, of the car-airplane of Figs. 1 and 2, converted to provide an airplane, and particularly showing the construction and arrangement of the frame of the car forming unit, and the running gear-landing gear, together with the engine mounting, and the propeller and the ground wheel drive mechanisms, and also showing the attachments of the flight unit to the attachment points of the frame of the car forming unit.

Fig. 8 is a detailed view, in vertical transverse section, through one of the flight unit attachment points of the frame structure of the car forming unit, with an attachment member of the flight unit in attached position thereon; and showing, partly in vertical longitudinal section and partly in side elevation one of the connecting and locking members or pins in position locking the flight unit attachment member to the frame attachment point.

Fig. 9 is a perspective view of one of the connecting and locking members for attaching the flight unit to attachment points of the frame of the car forming unit.

Fig. 10 is a detailed perspective view showing the upper portion of the frame structure of the car forming unit with the flight unit attachment points provided thereby, and a portion of the flight unit with its attachment members in relative position for mounting and attachment to the attachment points of the car forming frame structure.

Fig. 11 is a fragmentary detailed view in vertical longitudinal section through the main longitudinal wing spar of the flight unit at a forward attachment point thereof, in mounted attached position on the frame of the car forming unit, and showing, in elevation, portions of the flight control systems mounted in and carried by car forming unit and the portions thereof mounted in and carried by the flight unit, with a mechanism for separably connecting the flight unit carried sections with the car forming unit carried sections of the flight control systems.

Fig. 12 is a fragmentary, detailed view of the structure and arrangement of Fig. 11, partially in elevation and partially in vertical transverse section, taken as on the line 12—12 of Fig. 11.

Fig. 13 is a view in top plan of the structure and arrangement disclosed in Figs. 11 and 12.

Fig. 14 is a view in vertical, longitudinal section through the mechanism for separably connecting and associating the flight unit carried sections and the car forming unit carried sections of the flight control systems, showing such mechanism in side elevation in operative association connecting and coupling the sections of the flight control systems.

Fig. 15 is a view similar to Fig. 14, but showing the mechanism in separated positions to separate the flight unit and car forming unit sections of the control systems, with the flight unit detached from the car forming unit.

Fig. 16 is a perspective view, more or less schematic, showing the general layout and arrangement of the flight control systems with the car forming unit carried sections in operative association with the flight unit carried sections thereof, when the flight unit is in mounted attached position on the car forming unit to convert the vehicle to an airplane, the flight control systems being shown extending from the pilot operated control members in the car forming unit through the flight unit for operative connection with the control surfaces of the flight unit.

Fig. 17 is a detailed view in perspective, showing the separable crank members with their associated operating and operated levers, of the directional or rudder control system of airplane, in connected operative relation with the flight unit in mounted attached position on the car forming unit.

Fig. 18 is a detailed perspective view of the separable crank members with portions of their associated operating and operated elements, of the pitch or elevator control system for the airplane, in connected operative association with the flight unit in mounted attached position on the car forming unit.

Fig. 19 is a detailed perspective view of the separable crank members with their associated operating and operated elements, of the lateral or roll control system of the airplane, in connected operative association with the flight unit in mounted attached position on the car forming unit.

Fig. 20 is a view in vertical longitudinal section through the tail group or empennage of the flight unit, and showing in side elevation, the vertically disposed laterally displaceable rudder or directional control surface, and showing the horizontal stabilizer and elevator in vertical section, the operating controls for the rudder surface and elevator surface being shown operatively connected with such surfaces, respectively.

Figure 21:
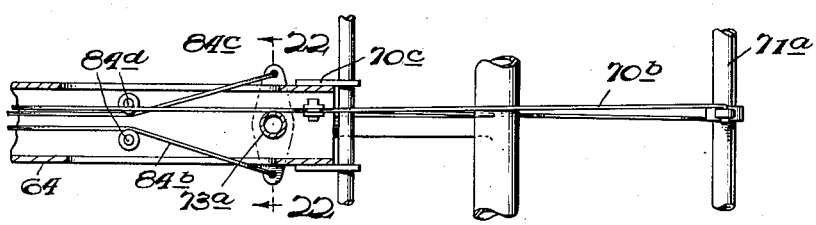

Fig. 21 is a fragmentary, detailed view of portions of the structure of the tail group, showing the rear end of one of the outrigger booms of the tail unit in horizontal section to disclose the boom mounted operating controls to the rudder surface and to the elevator surface of the tail group, portions of the frame structure only of the elevator being shown.

Figure 22:
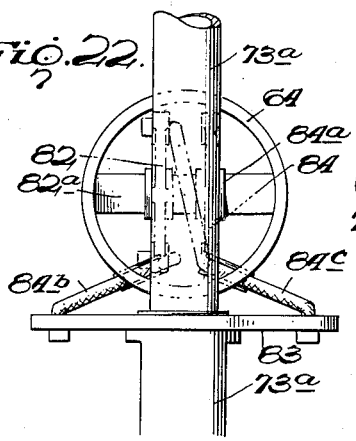

Fig. 22 is a detailed view in vertical, transverse section taken as on the line 22—22 of Fig. 21, through the outrigger boom and showing, in rear elevation, the rudder mast with its operating crank and associated operating members located in the boom.

Figure 23:
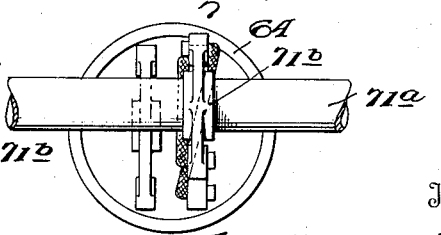

Fig. 23 is a detailed fragmentary view in rear elevation, of the boom mounted elevator operating means in operative association with the elevator operating crank, a portion only of the elevator being shown.

Figure 24:
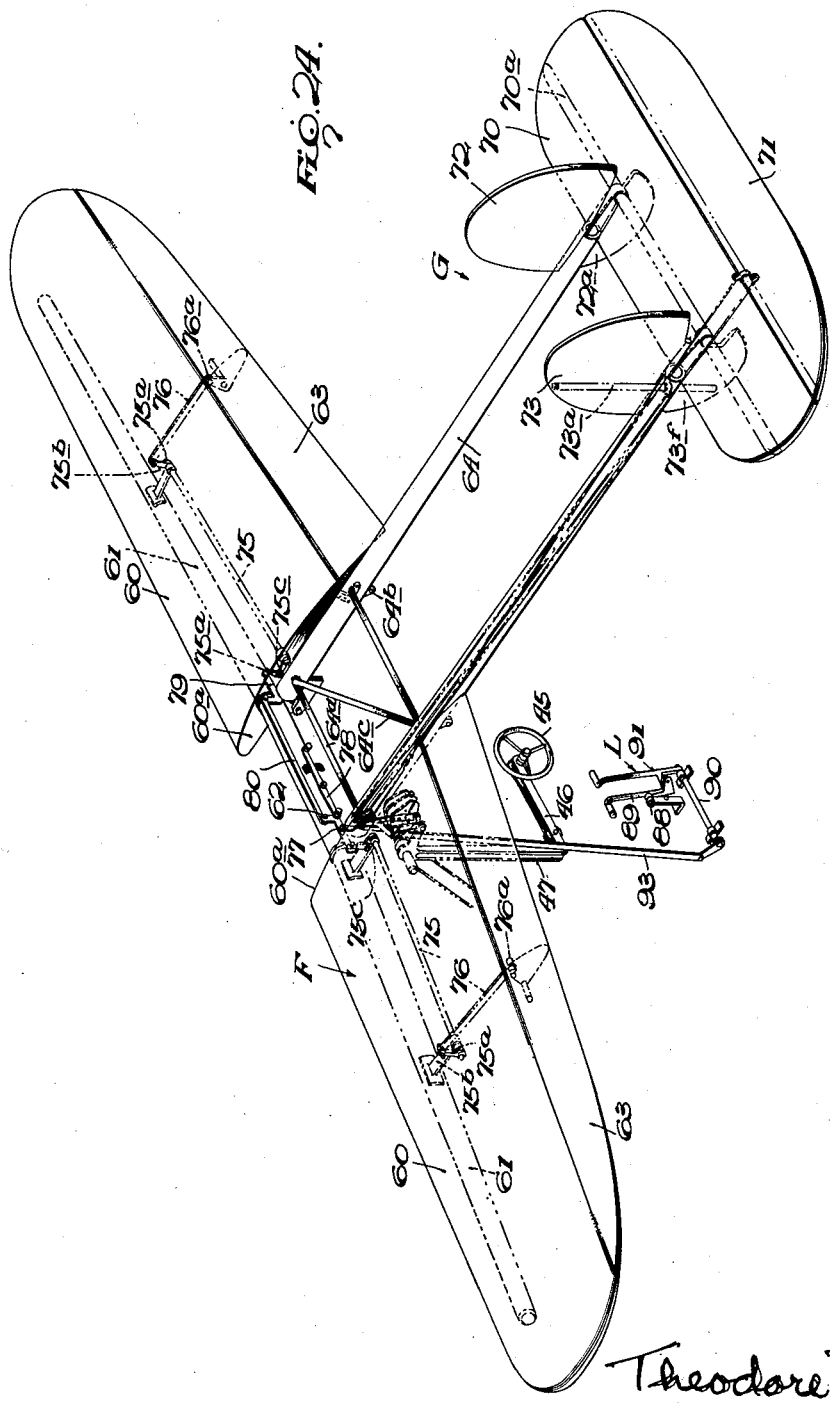

Fig. 24 is a perspective veiw of the flight unit detached and completely removed from the automobile or car forming unit, but with portions of the car forming unit carried sections of the flight control systems being shown in associated relation.

Figure 25:
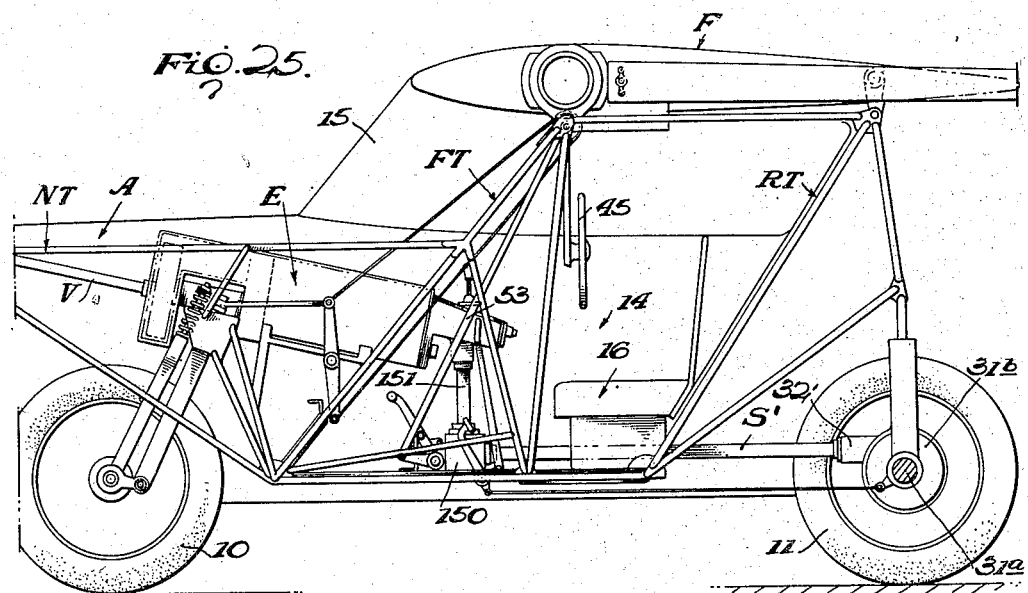

Fig. 25 is a view in side elevation, more or less diagrammatic, showing a modified arrangement of ground wheel drive and propeller drive mechanisms.

Figure 26:
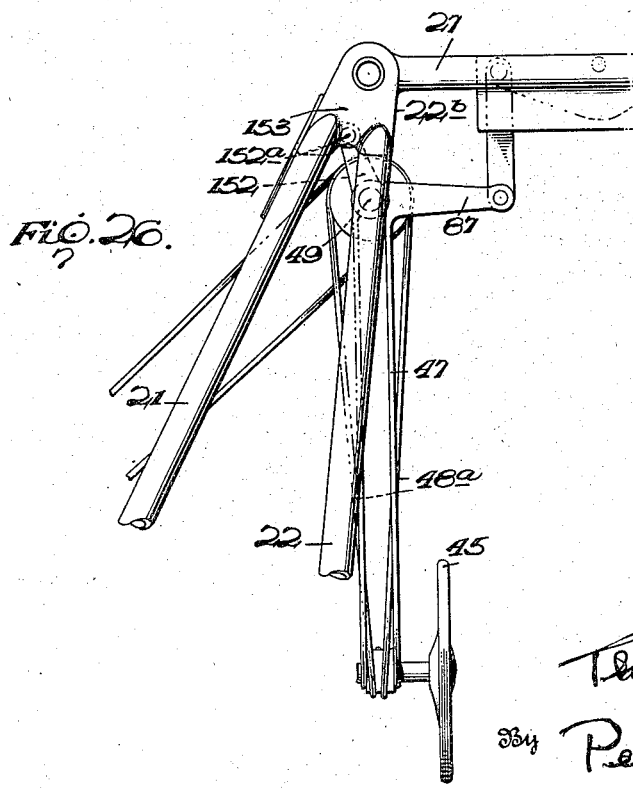

Fig. 26 is a detailed view in side elevation showing an arrangement for locking the elevator control arm against rocking to lock the control wheel against bodily forward and rearward swinging when in use as a steering wheel of the automobile unit when the convertible car airplane is converted to automobile use.

A convertible car-airplane embodying the principles and the various features of design, arrangement and construction of my present invention, is illustrated in the accompanying drawings and described herein primarily for purposes of explaining the invention to enable those skilled in the art to understand the same, and not by way of limitation or restriction, as the invention and the various features thereof are capable of and adapted to embodiment in various other designs, constructions and arrangements, both from the standpoint of the automobile or car forming unit and from the standpoint of the car-airplane formed by combining and coordinating the flight unit or aerodynamic elements with the automobile or car forming unit. In the embodiment of the invention illustrated herewith, the automobile or car forming unit is of the relatively small car type adapted to accommodate a driver and a passenger, while the airplane formed therewith by the addition of the flight unit thereto, is of the small airplane class, of monoplane, high wing type, adapted to accommodate a pilot and a passenger. However, it is to be understood that the invention is not limited or confined to the particular size, capacity, type or design of the automobile or of the airplane formed by and from the convertible vehicle, but the invention contemplates and includes automotive and aerodynamic expressions thereof into various sizes, classes, capacities and types of both the automobile or car forming unit and of the resulting airplane into which the automobile forming unit is converted.

Basically, a dual-purpose vehicle or convertible car-airplane of my invention embodies and is characterized by an automobile or car forming unit A, as disclosed in Figs. 5 and 6, in particular, of the accompanying drawings, and a flight unit including wings, tail group and aerodynamic control surfaces, such as the flight unit F shown in Fig. 24 of the drawings. In addition to the flight unit F, in the particular example of the invention selected for illustrative purposes herein, an additional flight element is included which is separate from the flight unit F, and which consists of the tractor propeller P adapted to be detachably mounted on a suitable driving shaft in position located at the forward or nose end of the car forming unit A, as will be clear by reference to Figs. 1, 2 and 7 of the drawings in particular. With these major or primary units, the dual-purpose vehicle or convertible car-airplane is converted to an airplane by detachably mounting the flight unit F on and in coordinated combination with the automobile or car forming unit A, and by detachably mounting the tractor propeller P on its drive shaft at the forward or nose end of the automobile or car forming unit A. The vehicle is converted from an airplane to an automobile or car by detaching and completely removing the flight unit F from the car forming unit A, and preferably by removing the tractor propeller P from the forward end of the unit A, whereupon unit A then forms a complete operable road vehicle or conventional type of automobile or car, although in connection with such conversion, it is not necessarily essential that the propeller P be detached and removed from the automobile or car forming unit in order to convert that unit for conventional use as a road vehicle.

*Automobile or car forming unit (airplane landing gear, body, and power plant)*

Referring particularly to Figs. 5 and 6 of the accompanying drawings in which the automobile forming unit A is shown converted to a road vehicle of conventional automobile or car form, the unit A provides in this instance, an automobile or small car of open type, accommodating a driver and a passenger in a suitable side by side seating arrangement and having a running gear of the three-wheel or so-called tricycle or directionally stable type, consisting of a steerable single front or forward wheel 10 located on the longitudinal or fore and aft center of the automobile, and the laterally spaced rear wheels 11. The automobile or car forming unit A includes suitable wall structure which determines the external shape and contour of and defines the body B of the unit, and in this instance, such body B is defined by opposite side wall portions 12R and 12L enclosing opposite sides of the structure, as well as covering and fairing the wheels 10 and 11 on the major portion of the outer side thereof. The opposite side walls 12R and 12L converge forwardlly and merge into the forward transverse wall or nose 12n (see Fig. 1), and also converge rearwardly to join and merge at and to form the rear end or tail portion 12t of the body. The opposite side walls 12R and 12L are joined by and merge into a hood forming and defining upper side or top wall 12h which extends from the forward or nose end wall 12n, rearwardly to an open top occupant space or compartment 14, and to the rear of this compartment the opposite side walls 12R and 12L merge and join into an upper side enclosed wall or deck 12d which extends from the rear side of the open occupant compartment 14 to the rear or tail end 12t of the body, with the upper side wall 12d sloping upwardly and forwardly from the tail end 12t to an elevated portion 12e thereof which extends forwardly to the rear side of the compartment 14. A wind shield 15 extends across the body at the forward side of the occupant space or compartment 14 and extends upwardly and is inclined rearwardly from the hood wall 12h to thus provide a forward enclosure across the forward side of compartment 14. In this instance, the windshield 15 diverges from the longitudinal center of the body outwardly and rearwardly to form a generally V-shaped windshield structure in top plan, as will be clear by reference to Fig. 6 of the drawings. The opposite side walls 12R and 12L at opposite sides of the compartment 14, are formed with doors 14' therein for horizontal swinging between open and closed positions, for access to and egress from the compartment 14, in general accordance with the usual or conventional automobile body arrangement.

Thus, the unit A provides a generally conventional automobile having the streamlined body B, which substantially encloses and fairs the wheels 10 and 11 of the running gear, while giving ample road clearance between the lower or under side of the body and the ground or road surface on which the unit A is being operated. In the particular design of automobile or car unit A of the illustrated example of the invention, the forward, central portion 12e of the upper side wall 12d of the body to the rear of the occupant compartment 14 extends upwardly to a higher level than the hood forming upper wall 12h which defines the portion of the body forward of the compartment 15, while the windshield 15 at the forward side of compartment 14, extends a distance upwardly and forwardly encloses the compartment to a height slightly greater than the height of the body portion 12e just to the rear of the compartment. Thus, the rear portion of the body B formed by the opposite side walls 12r and 12l joined by the upper or top wall portions 12d and 12e, provides an enclosed space within the body which may be made accessible for storage or load carrying uses, such for example as a baggage compartment, and which also, due to its shape and external contour, serves a fairing and streamlining purposes, together with the windshield 15, in connection with the conversion of the automobile or car forming unit A to an airplane by the mounting and attachment thereon of the flight unit F, as will be described in detail hereinafter.

Within the compartment 14 of this example, a suitable seating arrangement is provided by a transverse seat 16 disposed across the rear portion of compartment 14 with a seat back forming wall extending upwardly and inclined rearwardly from and along the rear side of the seat 16. The body compartment 14 is of such a width that the seat forming structure 16 provides side by side seats 16a and 16b within the compartment at opposite sides of the longitudinal fore and aft center line of the body B, as will be clear by reference to Fig. 6 of the drawings.

The length of the automobile or car forming unit A, even in the small car type example of the invention herein illustrated, is such that, with the forward wheel 10 located at the forward end of the body B and the rear wheels 11 located and positioned in the rear end portion of the body just aft and to the rear of the occupant compartment 14 thereof, a substantial and ample wheel base is thereby attained for the automobile forming unit A, with the occupant compartment 14 located intermediate the forward and rear wheels, and with the engine or power plant also located intermediate the forward and rear wheels, as will be described hereinafter. With such arrangement, the load concentration is such as to locate the center of gravity of the automobile at the desired low point intermediate and in such relation to the front and rear wheels 10 and 11, as to contribute to the attainment of practical roadability and satisfactory riding qualities for the automobile or car A, to a degree that is generally comparable to the corresponding factors and characteristics of the conventional types of automobile in the same general power and size class. The center of gravity location for the unit A is indicated on Fig. 5 of the drawings as the point marked CG.

While, as hereinafter described, the body B is of a generally streamlined shape and configuration, the forward or nose end wall 12n of the body provides a sufficient frontal area exposure, without breaking or sharply interrupting the streamline contour of the body, to permit of the installation and required surface area exposure of a liquid cooling radiator if a liquid cooled power plant is provided in the automobile unit A, or, as in the particular example hereof, to provide an air intake opening 17, referring now to Fig. 1 of the drawings in particular, of a sufficient area for intake of the required volume of air for circulation rearwardly to and in heat exchange relation with a suitable air cooled engine or power plant mounted installed in the unit A, as will be hereinafter described.

The automobile or car forming unit A, which includes the generally streamlined body B as hereinbefore described, has as its primary or basic load carrying structure, a design and arrangement of frame structure which is composed of a series of trusses for carrying, transmitting and distributing both the loads encountered by the unit A when the unit is converted to and used as an automobile or car, and certain of the loads and stresses encountered in the use of the unit A as an airplane when it is converted to form an airplane by the combination and coordination therewith of the flight unit F and the propeller P.

This basic structure of the unit A, referring now to Fig. 7 of the drawings in particular, in connection with Fig. 10, is, in this instance, formed as a frame structure constructed mainly from tubular material, although it is to be understood that other types of construction, such for example as monocoque construction, may be employed if desired. The basic structure of this example, includes the opposite side, horizontally disposed and laterally spaced, longitudinal tubular beams or rods 20, only one of which is shown in Fig. 7, which beams 20 form the base of the frame and define the lower side of the body B and the floor line thereof. A forward truss FT and a rear truss RT extend vertically upwardly from each longitudinal side beam 20, with the forward trusses FT at each side of the frame in alignment transversely of the body B, and with the rear trusses RT at each side of the frame also in alignment transversely of the body. The forward truss FT and the rear truss RT at each side of the frame on the respective longitudinal side beam 20 are mounted and arranged spaced apart from each other on and longitudinally of the beam 20. Each forward truss FT in the specific example hereof, includes a truss member or leg 21 secured at its lower forward end to the forward end portion of the side beam 20, at 21a, extending vertically upwardly from and inclined rearwardly relatively to the beam 20, and a vertically disposed truss member or leg 22 attached and connected at its lower end to the side beam 20 at a point 22a spaced a distance to the rear of the junction point 21a of truss member 21 with beam 20, and extending upwardly to and connected and joined at its upper end with the upper end of member 21 at 22b (see Fig. 10). The truss members 21 and 22 thus form the legs of a triangular truss having the base thereof formed by the side beam 20, and with the apex of the triangular truss formed generally by the junction 22b between the upper ends of members 21 and 22. The forward trusses FT are similar and the joined upper ends 22b thereof are spaced apart in transverse alignment and located at opposite sides of the body B, being located in the same horizontal plane spaced above opposite sides of the forward portion of the body compartment 14.

Each rear truss RT in the specific example hereof, includes a forward leg or truss member 23 joined at its forward lower end to the rear end portion of its respective side beam 20, at 23a, extending vertically upwardly and inclined rearwardly from beam 20, and a truss member 24 also attached at its lower forward end to the junction 23a of the truss member 23 with the rear portion of beam 20, this truss member 24 being extended vertically upwardly and inclined rearwardly from beam 20 at a lesser rearward angle of inclination than the angle of rearward inclination of member 23, to thereby diverge rearwardly and downwardly from truss member 23. The length of truss member 24 is such that the upper rear end thereof is located a considerable distance below the upper end of truss member 23 and, in this specific example, slightly to the rear of the upper end of member 23. A rear truss RT is completed by a truss member 25 extending between and connecting the rear ends of the truss members 23 and 24, the lower end of member 25 being joined to the upper rear end of member 24 through a joint or fitting 25a, and the upper end of truss member 25 being joined to the upper end of the member 23 through a joint or fitting 25b (see Fig. 10). The rear trusses RT are identical, and the joined upper ends with the fittings 25b are spaced apart in alignment transversely of the body B at opposite sides thereof and are located in the same horizontal plane as the plane in which the upper joined ends 22b of the forward trusses are located, with such rear truss upper ends positioned substantially to the rear of the rear of the compartment 14.

The portion of the trussed frame structure of the body B which includes the forward trusses FT and the rear trusses RT is completed by connecting and interbracing the upper ends of such trusses. Such upper end interbracing between the trusses FT and RT, in the specific construction of the present example, includes a brace rod or tube 26 disposed transversely to the body B in horizontal position extending between and joined at its opposite ends to the opposite upper end structures 25b, respectively, of the rear trusses RT, and the horizontally disposed opposite side brace rods or tubes 27 disposed longitudinally of the body B and each extending between and connected to the upper end structure 22b and the upper end structure 25b of the forward truss FT and the rear truss RT at each side, respectively, of the frame structure of the body B. The upper ends of the opposite side forward trusses FT are not, in this example, connected or interbraced, as will be explained hereinafter.

Thus, this trussed frame structure of the body B consisting of the opposite side trusses FT and RT, provides a series of, in this instance four (4), elevated points at the upper side and above the body B which form the corners of a rectangle defined and outlined by the brace rods or tubes 26 and 27 and by a line projected between the spaced opposite side forward points defined by the upper ends of the forward trusses FT, with the structures at such four (4) points rigidly positioned and held against lateral displacement or bending when loaded or stressed, by the brace rods or tubes 26 and 27, as well as by the trusses FT and RT supporting and providing such points. These four (4) points so provided and defined by the upper end structures 22b of the forward trusses and the upper end structures 25b of the rear trusses, provide the attachment points by which the flight unit F is attached and mounted to the automobile forming unit A to convert the vehicle to an airplane, as will be described and explained in detail hereinafter.

The frame structure of the body B of the automobile forming unit A, includes a front or nose forming pyramidal truss NT which extends generally horizontally forwardly from the vertically disposed forward trusses FT, only the left-hand side of this pyramidal truss NT being disclosed in Fig. 7 of the drawings. The truss NT comprises horizontally disposed truss members or tubes 28, referring now to Fig. 7 (only one of which is here shown), which are attached or joined at their rear ends to the members 21 of the forward trusses FT, respectively, at points 28a located intermediate the upper and lower ends of members 21, and these truss members 28 of the truss NT extend generally horizontally forwardly from the forward trusses FT and are inclined inwardly toward each other to converge and be joined at their forward ends through the medium of a bearing housing or support structure C. The pyramidal truss NT is completed by the truss members 29 secured and joined at their inner lower ends to the forward ends of the side beams 20, respectively, at the points of junction 21a between such beams and the members 21 of forward trusses FT, and these truss members 29 extend forwardly and upwardly and are inclined inwardly toward each other to converge and be joined at their forward upper ends with the converged forward ends of members 28, where they are joined together through the medium of the bearing support structure C.

Thus, the truss NT is of a pyramidal type, but generally horizontally disposed extending forwardly from the lower lengths of the forward trusses FT, the members 21 of which form the primary base of the truss, although preferably suitable cross bracing may be provided between the inner, rear ends of members 28 and the inner, lower ends of members 29 at their points of connection with the truss members 21 of the forward trusses FT, respectively. In the instant example, the truss NT is further tied into and braced against vertical loads by brace rods or tubes 30 which are connected at their upper ends to the points of connection 28a between the rear ends of members 28 of truss NT and the member 21 of trusses FT, respectively, and which extend downwardly and rearwardly and are connected at their lower ends to the points of connection 22a, respectively between the lower ends of the members 22 of trusses FT and the side beams 20.

It will be apparent therefore, by reference to Fig. 7, that the forwardly extending front or nose truss NT forms the basis for and determines and defines the forward or hood forming portion 12h of the body B of the automobile unit A, and also provides the mounting and supporting structure for a suitable bearing assembly C for a drive shaft for mounting and driving the tractor propeller P at the forward or nose end of the body B.

The frame structure is further braced and trussed by a brace rod or tube 43 at each side of the frame (only the left-hand tube 43 being shown in Fig. 7) extending from the junction point 21a at the forward end of the beam 20 at that side of the frame, rearwardly and upwardly to the tube or strut 30, with the rear end of the tube 43 attached to strut 30 at a point spaced above the beam 20, as will be clear by reference to Fig. 7. Preferably, a structural plate member 44 is attached across and between the strut 30 and the truss member 23 of the rear truss RT at each side of the frame, this structure plate 44 being of a depth to extend upwardly from the adjacent beam 30 with its upper edge approximately at the level of the rear end of tube 43 at its point of attachment to strut 30. The structure plate 44 at the left-hand side of the frame only is shown in Fig. 7, but the corresponding plate 44 at the right-hand side of the frame is in all respects identical and mounted and associated in the same manner as the plate 44 shown at the left-hand side of the frame.

*Running gear of the automobile forming unit (landing gear of the airplane)*

The automobile or car formed by the unit A, which includes the frame structure and the body B as hereinbefore described, with the frame structure forming and providing in effect the chassis for such automobile, is provided with a suitable running gear which includes the single front wheel 10 and the rear wheels 11 arranged and mounted to form a running gear (landing gear for the airplane) of the three-wheel or tricycle type.

The rear wheels 11 are spaced laterally or transversely of the body B in axial alignment, and form the driving wheels for propelling the automobile, and, in this instance these rear wheels 11 are spaced apart to give the vehicle a tread of a width substantially the width of the body B and are positioned at the outer side of rearward projections of the longitudinal axis of the laterally spaced longitudinal side beams 20 of the automobile chassis or frame, so that, the tread afforded by the wheels 11 is slightly greater than the outside width between beams 20. (See Fig. 1, in connection with Fig. 7.)

The rear wheels 11, referring now to Fig. 7 of the drawings, are mounted on and for propulsion by a more or less conventional type of axle shaft or shafts 31, journalled in the usual axle shaft housing 31a extending across and between and carrying at its opposite ends the brake drums 31b for the wheels 11 (only one of which is shown in Fig. 7). A more or less conventional differential drive mechanism or unit 32, is located at an intermediate point between the rear wheels 11 at the upper side of the axle shaft housing 31a in operative driving association with the axle shaft or shafts 31, the differential drive mechanism being operatively coupled with a propeller shaft from a suitable source of power. In Fig. 7 such propeller shaft is represented by an assembly of a shaft housing or tube S enclosing a propeller shaft therewithin in operative driving connection with the differential drive mechanism 32 in the usual manner familiar in the automotive art.

Each rear wheel 11 is primarily mounted on and attached to the frame structure of the unit A, by means of a leg or strut 33 connected at its upper end at and to a fitting provided by the joint 25a between the rear upper end of truss member 24 and the lower end of truss member 25 of the rear truss RT at the side of the body at which such wheel 11 is positioned, with the leg or strut 33 forming in effect a downward extension or continuation of truss member 25. A vertically acting shock absorbing mechanism, such as a so-called "oleo-strut," operatively connects the lower end of strut 33 with the axle shaft housing assembly 31a, in such a manner that each rear wheel 11 is vertically displaceable relative to the body B and the hereinbefore described frame structure thereof. With the rear wheels 11 mounted and connected to the frame structure through the oleo-struts O and associated struts 33 respectively, any suitable or desired drag and sway bracing (not shown) may be provided extending forwardly from the wheel mounting and assembly, for example, from the struts 33—O and/or the axle shaft housing or assembly 31a, to the frame structure represented by the rear trusses RT and/or the longitudinal beams 20 and any cross bracing therebetween.

In connection with the location of the rear wheels 11 spaced a sufficient distance to the rear of the forward wheel 10, so as to provide an adequate wheel base for the automobile A to attain practical and satisfactory roadability and riding characteristics, attention is directed to Fig. 7 of the drawings and to the center of gravity location indicated by the point thereon identified as CG. The indicated center of gravity location is the approximate location thereof when at its forward position of travel when the automobile unit A is converted to an airplane by the addition of the flight unit F thereto, and with such center of gravity location the rear wheels 11 are located and positioned to the rear of the center of gravity location at an angle of approximately fifty degrees (50°) from a vertical line passing through the center of gravity, as will be more fully referred to and explained hereinafter in connection with the vehicle when converted to an airplane.

The single front or nose wheel 10 is mounted so as to be of the controllable castering wheel type, with the center of gravity of the vehicle located intermediate this front wheel 10 and the rear wheels 11, so as to render this wheel arrangement of the running gear of the automobile (the landing gear of the airplane) more or less directionally stable as will be readily understood by those skilled in this art.

The front wheel 10 is, in this instance, rotatably mounted and supported in a fork assembly 34 which extends downwardly and is inclined forwardly from a supporting head and bearing structure 35 in which the spindle or head shaft forming member 36 at and extending centrally from the upper end of the fork 34, is journaled for rotation about the vertically disposed but forwardly inclined longitudinal axis of the fork 34. A pair of spaced generally horizontally disposed and forwardly extending links or arms 37 (one of which only is shown in Fig. 7 of the drawings) are pivotally mounted at their rear ends at 37a to the lower ends of the opposite legs of the fork 34, respectively, for vertical rocking about the horizontal axis of the pivots 37a. The axle 10a of the front wheel 10 is mounted in the forward end of said spaced links or arms 37 in position extending horizontally thereacross and therebetween, with the wheel 10 mounted for rotation in the fork assembly 34 about the horizontal axis provided by the wheel axle 10a, and with the wheel bodily vertically displaceable with the links or arms 37, around the horizontal axis provided by the pivot 37a of the links 37 on the lower end of the opposite arms of the fork 34.

Suitable shock absorbing and snubbing mechanism is provided for the front wheel 10, and such mechanism may, for example, take the form and arrangement as illustrated in Fig. 7 of the drawings, in which a forked or bifurcated member 38 is attached at its opposite lower ends to the opposite forward ends, respectively, of the wheel carrying links or arms 37, the wheel 10 being received and positioned in such forked member, and at its upper end is provided with an upwardly extending pin or rod 38a in longitudinal axial continuation of forked member 38. The pin or rod 38a forming the upper end or head of the fork member 38, is slidably received in and extends through a lug or lip member 36a fixed to and carried by the spindle 36 of the main fork assembly 34, and projecting forwardly therefrom and outwardly through a suitable opening (not shown) at the forward side of the bearing structure or head 35 of the wheel mounting, so that this lug 36a swings laterally with the rotation of the spindle 36 in either direction about its vertical axis, as the wheel 10 is swung laterally in either direction in steering the automobile. A suitable shock absorbing spring 39 is mounted on and around the pin or rod 38a between the underside of the lug 36a and the shoulder 38b formed by the upper end of the fork member 38 from which the pin 38a extends. A snubbing spring 40 is mounted on pin 38a above the lug 36a and between the lug and a suitable pin, projection, or stop 40a secured to the pin 38a at the upper end thereof for movement with the pin.

The head and bearing structure 35 is mounted and supported in rigidly fixed position along the center line or fore and aft axis of the body B, generally centrally within the pyramidal forwardly projecting nose truss NT, by opposite side pairs of struts or brace members 41. The pair of struts 41 at each side of the truss NT upwardly from the junction 21a between the truss members 29 of truss NT and the truss members 21 of truss FT, at the forward end of the frame side beam 20, and diverge forwardly and are secured at the upper ends thereof to the adjacent side of the head assembly 35, as will be clear by reference to Fig. 7, in which only the pair of struts 41 at the left-hand side of the frame is disclosed. However, the struts 41 at the opposite, right-hand side of the truss NT of the frame are in all respects identical and are identically mounted and attached between the points 21 at the right-hand side of the frame and the right-hand side of the head 35. Suitable brace rods 42 are secured and attached from each side of the fork head and bearing assembly 35, and each extends upwardly and rearwardly and is attached to its upper, rear end to the respective truss member 28 of truss NT at that side of the head or bearing assembly 35.

The front wheel 10 is thus mounted at the front or forward end of the automobile unit A, for lateral swinging about an upwardly and rearwardly inclined, vertically disposed axis defined by the fork 34 and its spindle 36, and for bodily displacement vertically upwardly and downwardly by rocking the wheel about the horizontal axis 37a formed by the pivotal mounting of the wheel carrying links 37 to the lower ends of the legs of the fork 34. Upon vertical upward rocking movements of the wheel 10 about axis 37a, or downward displacement of the body B relative to wheel 10, the shock absorbing spring 39 is compressed and functions to absorb the vertical loads and shocks imposed thereon, while the snubbing spring 40 acts to retard or snub the movements of the wheel 10 and body B away from each other when the loads and forces applied to the shock absorbing spring 39 by the body and wheel structures are relieved or reduced.

A suitable driver operated control for laterally swinging the front wheel 10 for directionally steering the automobile unit A when being operated on the road as an automobile, is provided, and such control in this instance includes a more or less conventional type of steering wheel 45 (referring now to Fig. 16 in connection with Fig. 7), mounted and supported in generally vertically disposed position transversely of and at the forward side of compartment 14 in front of the driver-pilot seat 16a for normal ease of manual rotation by a driver when seated in driving position in seat 16a. The steering wheel 45 is suitably rotatably mounted on a horizontally disposed arm 46 which extends outwardly from steering wheel 45, to the adjacent side of the body B, and this arm 46 is rigidly joined at its outer end with the lower end of a vertically disposed, depending arm 47 which is suitably mounted and supported at its upper end from the upper portion of the body frame structure, as will be fully described hereinafter. A pulley 48 is rotatably mounted on a horizontal shaft 49 disposed transversely of the upper end portion of the body frame structure adjacent the upper end of vertical arm 47, and this pulley is, for example, provided with two (2) circumferential belt grooves of required diameters, respectively. The wheel 45 is mounted on the forward end of an axle 45a which is rotatable therewith and which extends transversely through and is suitably rotatably journaled in the inner end portion of the arm 46. A grooved pulley 45b is attached on the inner end of axle 45a for rotation with the axle. A grooved pulley 46a is mounted at the junction of the outer end of arm 46 and the lower end of arm 47, for rotation on an axis 46b disposed transversely of said arms and generally parallel to the axis of the wheel axle 45a. The pulley 46a is an idler pulley and is provided with two (2) circumferential belt receiving grooves. An endless belt 48a is mounted over and extends between pulleys 45b and 48, this belt extending along arm 46 and changing direction over and on idler pulley 46 up to the pulley 48, so that, rotation of steering wheel 45 about the axis of its axle 45a actuates the endless belt 48a to rotate the pulley 48 on the shaft 49.

A vertically disposed crank 50 is suitably mounted within the truss NT of the body frame for rocking about a horizontal axis 50a intermediate the opposite ends of crank 50 and disposed transversely of body B. A cable 50b is mounted on pulley 48 around the upper side thereof, being received in one of the belt grooves of said pulley, and the opposite lengths of this cable extend downwardly and forwardly to and are connected with the opposite ends, respectively, of the crank 50, as will be clear by reference to Fig. 16 of the drawings in particular. The upper end of the fork spindle 36' has a radially disposed arm 51 (see Fig. 7) fixed thereto and extending from one side thereof, and an actuating link 51a is connected between the upper end of crank 50 and the outer end of the arm 51, so that, forward and rearward rocking of the crank 50 about its axis 50a will move the link forwardly and rearwardly to swing arm 51 to thereby rotate the wheel fork spindle 36 in the bearing structure 35 and swing the steering wheel 10 to the right or to the left for directional steering of the automobile A.

The endless belt or cable 48a between steering wheel pulley 45b and the pulley 48 on shaft 49, is suitably crossed so as to pass over and around the idler pulley 46a in the required positions to rotate pulley 49 in a forward direction by rotation of the steering wheel 45 to the right, and to rotate pulley 48 in a rearward direction by rotation of steering wheel 45 to the left, in order to rock crank 50 forwardly to swing wheel 10 to the the right and to rock crank 50 rearwardly to swing wheel 10 laterally to the left, by rotation of steering wheel 45 to the right and to the left, respectively.

The automobile or car forming unit A is provided with suitable wheel brakes which may be of any of the conventional or other suitable types, and in this particular example, the wheel brakes are provided for the rear driving or traction wheels 11 of the unit A. For instance, a suitable wheel brake is diagrammatically or schematically represented by the brake actuating arm or lever 56 on the right-hand rear wheel 11 shown in Fig. 1 of the drawings, for operative association with the wheel brake drums 31b. A similar wheel brake 56 (not shown) is provided on the left-hand wheel 11. The rear wheel brakes 56 are operated in the more or less conventional manner by suitable brake rods 56a which extend to the brake mechanisms 56, and which brake rods are operated in the usual manner by a conventional brake pedal 56b which is shown in Fig. 6 of the drawings. The brake pedal 56b is mounted in transverse alignment with the clutch pedal 53b at the right-hand side of the latter pedal, so that the brake pedal 56b does not show in Fig. 7 of the drawings. In connection with the brake mechanisms for the automobile unit A, brakes may be provided if desired for the front wheel 10, or for multiple front wheels if the latter arrangement is employed, and the brake mechanisms may be of any desired types, mechanical or hydraulic, suitable for the purpose.

While automobile running gear (airplane landing gear) of the three-wheel or tricycle, directionally stable type is disclosed in the present example, it is to be understood that the invention contemplates and includes, whenever desired or wherever found expedient, the embodiment and utilization therein of a running gear of the four-wheel or of the multiple front wheel types, having two front or forward wheels 10, which may or may not be of the castering type and mounted in accordance with the type and mounting of the front wheel 10. As well understood in the art, broadly a directionally stable running gear (landing gear) is not limited or restricted to any particular number of front wheels, and while the use of a single castering and steerable front wheel is preferable, as in the instant example, for purposes of streamlining and fairing, it is not essential to this broad type of running gear and is not essential in all respects to my present invention.

*Power plant for the automobile unit (Power plant for the airplane)*

The automobile or car forming unit A is provided with a suitable power plant for propelling the same as a road vehicle or automobile, and in accordance with my present invention such power plant also serves to furnish the power for propelling the vehicle when it is converted to an airplane by the combination of the flight unit F with the automobile unit A. The power plant for the unit A, in this instance, is formed by an engine E of the internal combustion, air-cooled type, referring now to Fig. 7 of the drawings, which may, purely for purposes of illustration and not of limitation, be considered to be say of a six-cylinder, air-cooled, opposed cylinder type. However, my invention is not limited or restricted to any particular type or design of internal combustion engine, or to power plants of the combustion type, as in its broader aspects any suitable type or principle of power plant which will meet the conditions and requirements of a convertible car-airplane of my invention, may be utilized.

The engine E is mounted and installed in the forward portion of the frame structure of the body B and, in this particular instance, is carried by an engine mount or bed 52 located generally within the front or nose truss NT at the hood portion 12h of the body B, said engine mount or bed being disposed in a generally forwardly and upwardly inclined position for receiving the engine E. The rear end of the bed or mount 52 is primarily supported at opposite sides thereof by members 52a attached and secured to the truss members 21, respectively, of the opposite side, vertically disposed trusses FT of the frame structure, while the forward elevated or raised end of the bed 52 may be supported at opposite sides thereof by the members 52b attached at their lower ends to the struts or brace members 41 at opposite sides of the pyramidal nose truss NT of the frame structure. If desired or found necessary, other bracing and support members may be provided from the trusses of the body frame structure to the engine mount or bed 52, for example, referring now to Fig. 10 of the drawings, a support and bracing tube 52c may be provided from the upper end of each frame truss FT to the adjacent side of the engine bed or mount 52, such bracing tubes 52c being suitably attached at their lower ends to the rear portion of the mount or bed 52.

The engine E is mounted and secured in position on the bed or mount 52 at an angle of inclination to the horizontal, such that, a forward projection of the longitudinal axis of the crank shaft or main driving shaft of the engine E, passes through and is axially aligned with the longitudinal axis of the bearing provided by the bearing structure and assembly C mounted at the forward end of truss NT, while a rearward projection of the longitudinal axis of the crank shaft or main drive shaft of the engine E lines in a plane passing through the upper side of the axle shaft housing assembly 31a. In other words, the engine E is mounted at a forward, upward inclination to the horizontal, so that a forward extension of the crank shaft or main drive shaft of the engine E may extend through and be journaled in the bearing structure C to serve and function as a direct propeller shaft V from the forward end of the engine E to the tractor propeller P at the forward or nose end of the unit A, as will be later described herein in detail.

In the particular example hereof, an assembly or unit 53 containing a conventional, or any suitable change-speed transmission mechanism and clutch mechanism, is mounted in position at and extending from the rear end of the engine E, in operative driven association with the crank shaft or main drive shaft of the engine E, and a drive or propeller shaft assembly S extends rearwardly from the transmission and clutch assembly unit 53 to the differential drive mechanism 32, through which the opposite rear wheels 11 of the automobile unit A are driven. The assembly 53 includes the conventional or any desired or suitable clutch mechanism for engaging and disengaging the transmission mechanism with and from the propeller or drive shaft S, in the usual manner familiar in the automotive art.

As the change-speed transmission and clutch mechanism assembly or unit 53 is located and positioned at the rear of the engine E within the forward portion of the compartment 14 within easy reach or access by a driver in driving position in the seat 16a, a gear shift or change-speed lever 53a is provided at the upper side of assembly 53 for manual actuation by a driver to operate the change-speed transmission mechanism of the assembly 53, in the usual manner familiar in this art.

The clutch mechanism of the assembly 53 is operated and controlled in the conventional automotive manner by means of a clutch pedal 53b mounted in the usual location forward of the driver's seat 16a in position for natural, comfortable foot operation by the driver. In the illustrated example, this clutch pedal 53b is mounted upon a horizontal torque shaft 53c which is disposed transversely of the body B at the floor line thereof, and a rearwardly extending crank arm 53d is mounted on the shaft 53c at the inner end thereof. A link or operating rod 53e is connected between the rear end of crank arm 53d and the usual operating member (not shown) of the clutch mechanism within the assembly or unit 53, so that forward swinging of the clutch pedal 53b will operate the clutch mechanism to disengage drive shaft of the assembly S, while rearward swinging of the pedal operates the clutch mechanism to engage the drive shaft of assembly S. The clutch pedal 53b is preferably spring loaded or biased in the usual manner against forward movement or rocking, and in normal released position thereof is maintained swung rearwardly with the clutch mechanism in position engaging the shaft of assembly S with the transmission mechanism of assembly 53.

An air circulating blower or rotary fan 55 is rotatably mounted adjacent but spaced from the forward end of engine E and is suitably driven from the engine. This blower or air circulating fan 55, forces air rearwardly over the engine E in heat exchange relation therewith for cooling the engine, air being delivered and fed to this blower or fan 55 through the air intake opening 17 in the forward or nose wall 12n of the body B (see Fig. 1). Preferably, a suitable housing or guide wall 55a is provided extending forwardly above and across the engine, being generally tangent to the top or upper side thereof, to the blower 55. The guide wall 55a at its forward end is preferably extended downwardly over and around the blower as indicated at 55b in Fig. 7. In addition to its function as an air circulating means, the blower or fan 55 is of a diameter and weight and with a weight distribution, such that, it also functions and serves effectively as a flywheel for the engine E, as the greater portion of the weight of the blower or fan 55 is concentrated on the outside diameter thereof to thereby obtain the inertia effect of a flywheel.

With the mounting, arrangement and relative positioning of the engine E of this example of the invention, the driving wheels 11 for the automobile or car forming unit A are driven from one end (rear end) of the engine E, while the propeller P for propelling the airplane, is driven from the opposite end (forward end) of the engine E, so that, separate and independent drive mechanisms are utilized to enable the operation of either drive mechanism without interference from the other drive mechanism, or, to permit of simultaneous operation of both drive mechanisms to thereby simultaneously drive the ground or traction wheels 11 of the automobile forming unit A, and the propeller P of the airplane when the vehicle has been converted to airplane form. Such engine mounting, arrangement and relative positioning in the automobile forming unit A, also makes it possible to utilize a direct extension of the crank or main drive shaft of the engine E as the shaft for driving the propeller P, as well as to utilize a direct, more or less in-line, drive from the opposite end of the engine E to the driving wheels 11 of the automobile forming unit A, with both such drives located in a vertical plane passing through the longitudinal center line or fore and aft axis of the unit A.

While the mounting and arrangement of the engine E and of the drive mechanisms therefrom to the driving wheels of the automobile unit and to the propeller for the airplane, of the particular embodiment and type of the invention here disclosed as an example, have certain definite advantages and desirable results, such engine mounting and drive mechanism arrangements are not essential or critical to the broader phases of my invention, and the invention contemplates and includes embodiments and design expressions thereof in which a pusher propeller is utilized instead of the tractor propeller of the present example. It is also to be understood that the invention in all of its expressions and forms is not limited to taking the traction wheel driving mechanism from one end of the engine and the propeller driving mechanism from the other, but includes designs and arrangements in which the drive mechanisms are taken from the same end of the engine, and also in which the traction wheel drive mechanism may be taken from the forward end of the engine and the propeller drive mechanism from the rear end of the engine. Also where it is found expedient or desirable, instead of a direct shaft drive for the propeller and/or for the driving wheels of the automobile forming unit A, offset drives may be employed, such for example in the present embodiment of the invention, as a propeller shaft offset or separate from the crank shaft or main drive shaft of the engine E with a suitable belt, chain or gearing type of drive mechanism from the engine shaft to the offset or countershaft. In such an arrangement, instead of mechanical forms of drive mechanism as referred to above, any suitable hydraulic forms of drive or power transmission mechanisms may be employed, and such hydraulic mechanisms are in contemplation of this invention to be considered as broad equivalents of mechanical forms of drive mechanisms. While a single propeller is shown in the illustrated example for propelling the air plane, it is to be understood that the invention includes multiple propeller arrangements when necessary or found expedient to meet the propulsion requirements of any particular type and design of airplane expressing and embodying the principles of my invention.

As an example, a modified arrangement of the drive mechanism from the rear end of the engine E to the drive wheels 11, is shown more or less diagrammatically in Fig. 25 of the accompanying drawings. In this modified form the drive shaft unit S' instead of extending directly forwardly from the differential drive mechanism 32 to the transmission unit 53 at the rear end of engine E, is extended forwardly substantially horizontally from a differential drive mechanism unit 32' which is located at the forward side of the axial shaft unit 31a. The shaft S' extends forwardly to a gear box 150 positioned substantially directly below the transmission unit 53, and a shaft 151 extends downwardly from the transmission unit 53 from which it is driven to the gear box 150, such gear box 150 obtaining suitable gearing (not shown) operatively coupling shaft 151 with the drive shaft S'. By this arrangement the necessity for extending the drive shaft S across the seating arrangement in the compartment 14 is eliminated. If desired or found expedient the propeller P instead of being driven from the front end of engine E by the shaft V as a direct extension of the main shaft of engine E can be driven by suitable shafting and gearing from the gear box 150 or directly from the shaft 151. Such arrangement exemplifies those arrangements of the invention in which the propeller P and the driving wheels 11 are driven from the same end of the engine E.

The seat structure 15 provides the side by side seats 16a and 16b, which seats are, in effect, divided or separated by the wheel driving shaft assembly S which extends downwardly and rearwardly from the engine through the compartment 14 and across seat structure 15. The seat structure 16 also includes a back forming wall 16c, and the seat 16a which forms the driver-pilot seat, locates and positions the driver-pilot facing the steering wheel 45 for manual operation thereof in the usual manner to actuate the steerable front wheel 10 for directionally controlling the automobile unit A on the ground or road, as well as in position for suitable operation of the clutch pedal 53b and the brake pedal 56b, which pedals are located in the more or less standardized positions in accordance with conventional automobile practice. If desired, in the specific example hereof, fuel and oil tanks may be located under the seat structure 16 as represented in Fig. 7 at 16d. The compartment 14 may also be provided with the usual or any suitable instrument panel (not shown) located at the forward side of and across the compartment 14 in position to be readily visible to a driver in seat 16a, and similarly it is to be understood that the usual controls (not shown) for the engine E will be located in the compartment 14, accessible to a driver-pilot in the seat 16a, but it is not considered necessary in this instance to disclose such instrument panel or engine controls as they are purely conventional equipment installed to meet the structure and location conditions of the design of the illustrated example hereof.

Thus, the unit A provides a complete, self-contained road vehicle of the conventional automobile type, having a substantial width tread and length of wheel base for the overall dimensions, weight and horsepower of the unit in accordance with general automotive running gear and body design factors and characteristics. The oleo-strut units O which support the rear of the body on the rear wheels 11, and the shock absorbing and snubbing springs 39 and 40 upon which the forward end of the body rides on the front wheel 10, provide the shock absorbing, spring or elastic mounting and suspension for the automobile, so that the unit A embodies all those basic factors by which the necessary riding and handling qualities are present to attain practical road operation of the unit in the general automotive sense.

The flight unit

The aerodynamic or flight elements by which the unit A is converted into an airplane for flight operation and use, with the unit A forming the landing gear and body of the airplane, are embodied into a flight unit F for detachable mounting on unit A to convert the unit to an airplane, and for detachment and removal therefrom to convert the unit A to a conventional automobile. Such flight unit F, in this instance, basically includes the lift developing surfaces or wings; the tail assembly or group and the structure associating such assembly with the wings; the aerodynamic control surfaces for the airplane and certain portions or sections of the control mechanisms for operating such surfaces.

The flight unit F is shown detached and removed from the automobile unit A, in Fig. 24 of the drawings in particular, while it is shown in mounted and attached position on the unit A to convert the vehicle to an airplane, particularly in Figs. 1, 2, 3 and 7. The airplane formed and designed in accordance with the present embodiment of my invention, is of the high wing, monoplane type, embodying the opposite wings 60, each including a suitable wing frame structure embodying a main longitudinal wing beam or spar 61 of tubular construction positioned in the wing in a position at approximately twenty-five per cent (25%) of the mean aerodynamic chord, together with suitable wing ribs disposed chordwise of each wing transversely of the spar 61 (see Fig. 24). These opposite wings 60 are mounted and positioned in the flight unit F with their inner root ends 60a spaced apart and with the tubular wing spars 61 in axial or longitudinal alignment. The opposite wings 60 are connected and joined in position with their root ends 60a spaced apart by a connecting extension of the opposite wing spars 61, consisting of a tubular spar section 62 suitably connected at its opposite ends, as by bolting or in any other desired manner, to the adjacent inner root ends, respectively, of the spars 61, as will be clear by reference to Figs. 10 and 24 of the drawings in particular. Thus, the spar section 62 connecting the opposite wing spars 61 forms with the latter spars what is in effect a continuous spar through the wings and across and connecting the spaced inner root thereof. If desired, a continuous tubular spar may be employed as the full equivalent of the sectional spar formed by the opposite wing spars 61 and the connecting spar section 62.

Each opposite wing 60 has the trailing section or portion thereof, from the inner root end to the tip of the wing, formed by a control surface or flap 63 which is hingedly or pivotally mounted to the fixed wing structure, so that, such control surface or flap 63 is vertically swingable upwardly or downwardly to positions vertically angularly displaced relative to the wing 60 on which it is mounted and of which it forms a part. These opposite wing control surfaces or flaps 63 function as combined ailerons or roll control surfaces and flaps, in a manner to be described and explained in detail hereinafter.

The flight unit F also includes an empennage or tail group G mounted upon the rear or trailing ends of an outrigger structure formed by spaced booms 64, which are preferably of tubular construction and which are mounted and positioned with their forward end lengths disposed along the adjacent root ends 60a, respectively, of the opposite wing 60. Referring now to Fig. 10 of the drawings in particular, in connection with Figs. 4 and 24, each outrigger boom 64 extends forwardly along the root end of the adjacent wing 60, being suitably secured and attached to the wing structure, disposed chordwise of the wing, and terminating at its forward end 64a at but spaced slightly from the rear of the wing spar section 62. In this specific example, the forward end 64a of each outrigger boom 64 is provided with a vertically disposed plate fitting 65 which depends from the underside of the boom 64 and extends forwardly from and in a plane below the forward end of the boom 64a to form a forwardly extended attachment arm 66. The plate fitting extends upwardly and diametrically traverses the bore of the tubular boom 64 to form a bulkhead or wall 65a within and disposed longitudinally of the spar at the forward end 64a thereof. The forward end 64a of each outrigger boom 64 is connected to the continuous wing spar 61—62 by a connecting link 67 which is attached at its rear end to the bulkhead or wall 65a formed within the boom and which extends forwardly and is attached at its forward end to an external radially disposed flange or bulkhead provided by a suitable annular fitting 68 secured on and around and rigidly attached to the spar 61—62, as by welding or in any other suitable manner. Each of the flange forming fittings 68 is formed to provide at the lower side thereof beneath the wing spar, a depending lug or ear 68a disposed in a vertical plane parallel to the vertical plane of the adjacent attachment arm 66 which is positioned at the inner side thereof, and a transverse bore 68b is formed through the depending ear 68a and the attachment arm 66 at the inner side thereof, as will be clear by reference to Fig. 10 of the drawings. Each attachment arm 66 may be attached to the adjacent lug 68a, to complete the attachment of the boom 64 to the wing spar, as referred to hereinafter. The attachment arms 66 and depending lugs 68a located and positioned at the outer sides of said arms, respectively, form and provide the forward attachment members for detachable connection with the upper end structures of the spaced forward frame trusses FT of the body B, as will be later described herein.

Suitable cross bracing is preferably provided between the forward end lengths of the spaced outrigger booms 64, and in the particular example hereof, such cross bracing takes the form of a cross brace rod 64b between booms 64, spaced a distance to the rear of the forward ends 64a of the booms 64, with a diagonal brace rod 64c extending from one end of rod 64b and inclined forwardly across and between the boom 64 to the inner side of the opposite boom adjacent the forward end 64a thereof, and a cross brace rod 64d between the forward ends 64a of booms 64.

An attachment ear or lug 69 is provided on each outrigger boom 64 located thereon and depending therefrom spaced a distance to the rear of the forward end of the boom 64a, to position the lug 69 on the booms in locations for attachment to the upper ends 25b, respectively, of the spaced opposite side rear trusses RT of the frame structure of the body B. In this instance, the cross bracing rod 64a extends across and between portions of the spaced outrigger boom 64 adjacent the depending attachment ears or lugs 69.

Tail group or empennage

The spaced rear ends of the outrigger booms 64 of the flight unit F, mount and carry the tail group or empennage G, which group includes the horizontal stabilizer surface 70, the vertically angularly displaceable elevator surface 71 pivotally mounted along the trailing edge of the normally fixed stabilizer surface 70, and the spaced vertically disposed surfaces 72 and 73 forming vertical stabilizing surfaces, with one of such surfaces, in this instance the left-hand surface 73, being laterally displaceable about a vertical axis to form and function as a directional or yaw control surface.

The horizontal stabilizer 70, referring now to Figs. 20 and 21 in connection with Fig. 24, embodies a frame structure suitably covered by an enclosing skin or covering in the more or less usual manner, which frame structure includes a main longitudinal spar 70a and suitable chordwise ribs 70b disposed transversely thereacross and secured thereto. The horizontal stabilizer 70 is mounted and attached to and extending across and between the spaced rear ends of the outrigger booms 64, by any suitable attachment and mounting means, which in this instance takes the form of a fitting 70c (see Fig. 20) secured and mounted in and to the rear end of each boom 64, to which fitting the leading edge structure of the stabilizer is pivotally connected by a suitable nose attachment fitting 70d (see Fig. 20). A bracket fitting 70e is secured to the upper and under sides of the rear end of each outrigger boom 64, and projects rearwardly therefrom and is attached at its rear end to a fitting 70f fixed to the adjacent forward side of the stabilizer spar 70a, as will be clear by reference to Figs. 20 and 21 of the drawings. In this manner the horizontal stabilizer 70 is secured at spaced points along the span thereof to the spaced rear ends of the outrigger booms 64, with the stabilizer in horizontally disposed position extending across and between the ends of the outrigger booms and a distance laterally outwardly beyond the opposite booms, as clearly shown in Figs. 3 and 24 of the drawings. By this mounting and attachment of the horizontal stabilizer 70 to the ends of the outrigger booms 64, the location of the booms is such relative to the span of the stabilizer, that the horizontal stabilizer 70 is supported at about the one-third (⅓) span point, thereby keeping bending moments and structural weights to a minimum. However, attention is here directed to the fact that the invention is not limited to this particular location of the supporting points, since it is possible to mount and support the tail at and from the opposite ends or tip portions of the horizontal surfaces if desired or found expedient, or if such mounting and arrangement is dictated or of advantage in any particular design.

The elevator 71 is pivotally connected or hinged to and along the trailing edge of the normally fixed horizontal stabilizer 70, the elevator being vertically swingable upwardly and downwardly about the hinge axis 71a (see Figs. 20 and 21) along and between and pivotally connecting the trailing edge of stabilizer 70 and the leading edge of elevator 71.

In this instance, the vertical surfaces 72 and 73 form a twin tail for the airplane, and are mounted in vertically disposed position on and extending longitudinally relative to the spaced outrigger booms 64, respectively, at the rear or tail end of such booms. The vertical surface 72 is a fixed surface and forms a vertical stabilizer, being mounted on the rear end portion of the right-hand outrigger boom 64 disposed in a vertical plane passing through the longitudinal axis of boom 64, with the vertical stabilizer surface 72 extending rearwardly beyond the end of the boom 64 on which it is mounted and a distance rearwardly across and above the horizontal stabilizer 70. The major portion of vertical surface 72 extends upwardly above the boom 64 on which it is mounted, but a portion or section 72a thereof also is extended below the boom and the horizontal stabilizer, the vertical surface being in effect formed of an upper section, and a lower section 72a, mounted at and fixed to the rear end of the right-hand boom 64, with the sections making up the surface 72, extending rearwardly above and below but spaced from the horizontal stabilizer to an extent or degree to give ample clearance between the horizontal stabilizer 70 and the sections of the vertical stabilizer surface 72 thereabove and therebelow.

The vertical surface 73 of the twin-tail, is of the same area and the same shape and contour as the surface 72 thereof, but is mounted on the left-hand outrigger boom 64 opposite and generally parallel normally to the surface 72, for lateral swinging or displacement about a vertical axis to function and serve as a rudder surface to develop yawing moments for directional control of the airplane. Referring now to Figs. 20 and 21 of the drawings, the movable vertical rudder surface 73 embodies a frame structure which includes a main spar or beam 73a with transverse rib members 73b extending transversely thereacross and attached thereto, such rib members being connected at the forward end thereof to the usual leading edge member 73c extending thereacross. The trailing ends of the rib members 73b are connected to the usual trailing edge member 73d which extends thereacross, the upper ends of the members 73c and 73d being connected to and joined with the tip member 73e. This basic frame is suitably covered or enclosed within a skin, in the more or less usual manner familiar in the art. The vertically disposed main spar or beam 73a is mounted extending vertically through the rear end portion of the left-hand outrigger boom 64 for rotation therein as a shaft or mast to laterally swing or displace the vertical surface 73 about the shaft 73a as an axis. The vertical surface 73 is completed by a lower or under section 73f which is mounted upon a downward extension 73g of the main spar or shaft 73a, and which carries out the shape and contour of the surface 73 below or beneath the rear end of the boom 64 and the horizontal stabilizer 70. Thus, the complete vertical surface 73, including the lower section 73f thereof, is mounted at the rear end of the left-hand outrigger boom 64 for lateral swing or displacement about the vertical axis formed by the main spar or shaft 73a of this vertical surface 73. The upper portion of the surface 73 which extends rearwardly a distance over the stabilizer 70, and the lower section 73f of the surface 73 which extends rearwardly a distance below the stabilizer 70, are spaced from the upper and lower surfaces, respectively, of the horizontal stabilizer 70 in order to provide ample operating clearance between the stabilizer and the vertical rudder surface 73 for lateral swinging or displacement of the rudder surface.

By the foregoing mounting and arrangement, the vertical surface 73 is bodily swingable or laterally displaceable about the axis 73a—73g, and as this vertical rudder surface 73 extends and is located above and below the horizontal stabilizer 70, and is swingable or displaceable in its entirety, and as there is no structure or surface immediately forward of this vertical surface, any blanketing of this vertical rudder surface by the horizontal surfaces of the tail group or by structure forward of the surface, is avoided under all flight altitudes and conditions. Such twin tail arrangement which embodies the spaced, vertical surfaces 72 and 73 provides a directional control by the lateral swinging or displacement of only one of these vertical surfaces, which thus materially reduces the number of movable parts, structure and mechanism, over those required with twin tail arrangements of the art in which both vertical surfaces are displaced for directional control. Also, the arrangement of twin tail surfaces makes it unnecessary to provide for additional fixed vertical stabilizing surfaces, as the entire area of the fixed vertical stabilizing surface 72 is utilized and functions solely for stabilization, while the movable rudder forming, vertical surface 73 in addition to functioning as a directional control surface, will also function to contribute to longitudinal stabilization. By locating the movable directional control surface for rudder 73 in position spaced laterally from the longitudinal or fore and aft axis of the airplane, such surface functions effectively to develop yawing moments acting laterally in either direction about the center of gravity of the airplane for directional control.

In connection with the tail group G and the design, arrangement and mounting of the twin vertical surfaces 72 and 73 spaced laterally at opposite sides of the longitudinal or fore and aft axis of the airplane, with one of the surfaces fixed and the other movable laterally to develop yawing moments for directional control, it is to be understood that such design and arrangement is not limited or restricted in its adaptations and uses to convertible car-airplanes, either of the particular type here disclosed or of any other type or design, but is adapted to aircraft generally in which such arrangement of twin vertical surfaces may be useful and of advantage. While I have disclosed and described a rudder 73 of a design in accordance with my present invention, applied to and utilized in the tail group G for the particular embodiment of the convertible car-airplane of my invention of this example, it is to be understood that, if desired or found expedient, conventional or other types of rudders or directional control members may be employed.

*Flight control systems on the flight unit*

The flight control of the airplane is broadly conventional, in that, lateral or roll control is obtained by differential vertical deflection or angular displacement of the opposite wing control surfaces or ailerons 63; pitch control is obtained through vertical deflection or angular displacement of the horizontally disposed elevator surface 71 of the tail group G; and yaw or directional control is obtained through lateral swinging or angular displacement of the vertical rudder surface of the tail group or empennage G. In accordance with my invention the control systems for these various control surfaces through which their operation is obtained for control of the airplane in flight are mounted and installed on and in the flight unit F, for separable operative association with pilot actuated operating controls therefor mounted and installed in the automobile or car forming unit A, with which unit A the flight unit F is combined and detachably mounted to form the airplane of a convertible car-airplane of my invention.

At this point attention is directed to the fact that, while in the example hereof I have disclosed the conventional three-flight control system, my invention contemplates and includes the use of a two-flight control system if desired, as the provision of the directionally stable and controllable type of landing gear as disclosed in the present example, particularly lends itself to the use of such a two-flight control system.

In the present example, the system mounted and installed on the flight unit F by which differential actuation of the lateral control surfaces or aileron 63 on the opposite wings 60 is effected for developing rolling moments for controlling the airplane in roll or laterally, includes a torque shaft 75, referring now particularly to Figs. 2 and 24 of the drawings, mounted in each wing 60, disposed spanwise thereof spaced to the rear of the wing spar 61 and suitably supported and journaled in supporting bearing brackets 75a fixed to and extending rearwardly from the spar 61 of the wing. Each torque shaft 75 terminates at its outer end approximately midway of the span of the wing and is provided with an upwardly extended crank 75b, and extends to and terminates its inner end at the inner side of the root end 60a of the wing and is provided at its inner end with a crank arm 75c extending forwardly therefrom. A link 76 is pivotally coupled at its forward end to the upper end of the crank 75b and extends rearwardly through the wing to the vertically displaceable lateral control surface or aileron 63 to which it is pivotally connected at 76a for swinging or rocking aileron 63 about its hinge axis 63a. Thus, rotation of a torque shaft 75 will rock the crank 75b thereon to move link 76 forwardly or rearwardly to swing the aileron 63 with which it is pivotally coupled, upwardly or downwardly about the hinge axis 63a of the aileron.

In this instance, an operating bell crank 77 is located on the rear side of the spar section 62 which connects and extends across and between the spaced root ends 60a of the opposite wings 60. The bell crank 77 is located adjacent the root end of the left wing 60 and is mounted for vertical rocking about a horizontal axis disposed transversely relative to the spar section 62, and with its longer arm 77a disposed horizontally and extending outwardly toward the root end 60a of the left wing and terminating adjacent but spaced above the crank 75c at the inner end of torque tube 75. The bell crank 77 provides a short arm 77b at the inner end of arm 77a, and this short arm 77b is vertically disposed and extends upwardly from the long arm 77a. This operating bell crank 77, in the specific example hereof, is mounted upon and carried by the outer end of a horizontally disposed lever 78, which lever is mounted for vertical rocking on and about a pivot pin 78a mounted and secured on the spar section 62 disposed transversely or radially relative to the spar section, so that, this lever 78 is positioned substantially parallel to the spar section 62, and is vertically rockable about the axis defined by pin 78a. The operating bell crank 77 is pivotally mounted for vertical rocking on a horizontally disposed pin or stud 77c mounted and carried on and extending transversely of the outer end of lever 78. The inner end of lever 78 is provided with an operating handle 78b by which the lever may be vertically rocked to raise and lower the position vertically of the operating bell crank 77. A suitable detachable locking means 78c, which may take the form of a toothed quadrant for suitable releasable engagement by arm 78 is provided for detachably locking arm 78 in any vertically adjusted position to which it may be manually swung.

A similar operating bell crank 79 is mounted in vertically disposed position adjacent the root end 60a of the right wing 60, for vertical rocking about a horizontal axis disposed transversely of spar section 62, provided by a pivot pin or stud 79c, which pin or stud is mounted on and secured to the spar section 62 at the rear side thereof, with the long arm 79a of this crank extended outwardly to and terminating at the adjacent root end 60a of the right wing 60 in position spaced above the forwardly extending crank 75c of the aileron operating torque shaft 75 of the right wing 60. The short arm 79b of bell crank 79c extends vertically upwardly from the bell crank at the pivot pin 79. A connecting link 80 operatively connects and joins the operating bell cranks 77 and 79, being pivotally connected at its opposite ends to the upper ends, respectively, of the upwardly extended short arms 77b and 79b of these spaced bell cranks 77 and 79. The inner end of the long arm 77a of bell crank 77 is connected with the forward end of the torque shaft crank 75 at the root end of the left wing 60 by a link 75d, the link being pivotally connected at its opposite ends to the adjacent ends, respectively, of crank 75c and bell crank arm 77a. A similar link 75d operatively connects the outer end of the long arm 79a of crank 79 with the forward end of crank 75c of torque tube 75 of right wing 60.

An operating link 81, referring now to Fig. 19 of the drawings in particular, in connection with Fig. 16, is pivotally connected at its upper end at 81a to the long arm 77a of operating bell crank 77 and depends downwardly therefrom for transmitting control operating forces to the bell crank 77 for actuating the aileron operating mechanism above described. Thus, vertical movements upwardly and downwardly of link 81 will rock bell crank 77 vertically about its axis, which vertical movements will be transmitted by connecting link 80 from bell crank 77 to the opposite bell crank 79 adjacent the inner or root end 60a of the right wing 60. For example, upward movement of link 81 will rock the long arm 77a of bell crank 77 upwardly and through link 75d and crank 75c will cause rotation of the torque shaft 75 in left wing 60 rearwardly, to rock crank 75b rearwardly which will force link 76 rearwardly to deflect or displace the aileron 63 of the left wing 60 downwardly about the axis of hinge line 63a. Simultaneously, the upward rocking of long arm 77a of bell crank 77 will rock the short arm 77b of this crank inwardly to force link 80 outwardly toward the right wing 60. Such outward movement of link 80 will rock bell crank 79 to swing the long arm 79a thereof downwardly, and through link 75d and crank 75c on torque shaft 75 in the right wing 60, will result in rotation of said shaft 75 forwardly to swing the crank 75b thereon forwardly. Forward movement of crank 75b will move the link 76 forwardly to deflect or displace the aileron 63 of the right wing 60 upwardly about its hinge axis 63a. Such operation of the aileron control system to displace left wing aileron 63 downwardly and right wing aileron 63 upwardly will establish rolling moments acting in a direction to roll the airplane to the right. An operation of the aileron control system in the reverse direction, by rocking the long arm 77a of crank 77 downwardly will cause the system to displace the left wing aileron 63 upwardly and the right wing aileron 63 downwardly to thus establish rolling moments acting in a direction to roll the airplane to the left, that is, left wing 60 depressed and right wing 60 raised, all as will be readily understood by those skilled in this particular art.

In accordance with a feature of my invention, as expressed in the present example of a design and arrangement thereof, the opposite wing ailerons or roll control surfaces 63, also function and are utilized as wing lift capacity varying, trailing flaps. In carrying out this feature, provision is made for simultaneously displacing the opposite ailerons 63 in the same direction, either upwardly or downwardly, but without interfering with or interrupting the simultaneous differential operation thereof as ailerons or roll control surfaces in any position to which these ailerons may be simultaneously displaced in the same direction to function as wing flaps. The operation and functioning of the opposite ailerons 63 as wing lift capacity varying flaps, is effected in the present example, referring now to Figs. 12 and 16 of the drawings, through the medium of the lever 78 which is coupled into and forms a part of the aileron control operating system and which, in this instance, mounts and carries the operating bell crank 77 for the left wing aileron 63. By rocking lever 78 about its pivot pin 78a to swing the outer, left-hand arm thereof upwardly to move bell crank 77 upwardly and inwardly, the torque shaft 75 in the left wing 60 and the torque shaft 75 in the right wing 60 will be simultaneously rotated rearwardly which, through the medium of the links 76, will result in simultaneously lowering or downwardly displacing the opposite wing aileron 63. A movement of the lever 78 in the reverse direction, that is by moving handle 78b thereof upwardly, will result in simultaneous upwardly swinging or displacement of the opposite wing aileron 63. However, in any position to which the opposite wing aileron 63 may be simultaneously swung through the medium of the lever 78, the control system for simultaneously differentially displacing these opposite wing ailerons for roll control, will not be impaired or rendered inoperative, as the bell cranks 77 and 79 with their connecting link 80 are free to be operated for differential displacement of the opposite wing aileron 63, in any position to which moved by lever 78, in the manner hereinbefore described.

The control system for the elevator 71 of the tail group G includes, referring now to Figs. 16 and 20 of the drawings, a crank 71b mounted and fixed to the leading edge member of the elevator 71 at the hinge axis 71a about which the elevator is vertically swingable, with the opposite arms of the crank 71b extending above and below the elevator 71. The crank 71b is mounted on the elevator 71 in position at the rear and in line with the left-hand outrigger boom 64. A vertically disposed crank 82 is mounted in vertically disposed position within the forward end 64a of the left-hand boom 64, for rocking about a shaft 82a disposed transversely of the longitudinal axis of the boom 64. An operating cable 82b is attached to the upper end of crank 82 above shaft 82a and extends rearwardly through the boom 64 and is connected at its rear end to the lower end of crank 71b below the hinge axis 71a of the elevator 71, and a cable 82c is connected at its forward end to the lower end of crank 82 below the shaft 82a, and this cable extends rearwardly through boom 64, crossing cable 82b, to the upper end of the crank 71b of elevator 71 above the hinge axis 71a of the elevator. The crank 82 at the forward end of boom 64 is provided with a crank arm 82d extending forwardly therefrom and radially relative to the shaft 82a on which crank 82 is mounted, and an operating link 82e is pivotally connected at its upper end to and depends from the forward end of crank arm 82d.

Thus, downward movement of link 82e of the elevator control system, will rock crank 82 to move cable 82c rearwardly and draw cable 82b forwardly to thereby rock elevator crank 71b about the hinge axis 71a in a direction to swing or displace the elevator 71 downwardly. Upward movement of the link 82e will rock crank 82 in the reverse direction to draw cable 82c forwardly and move cable 82b rearwardly to thereby rock the elevator crank 71b in a direction to swing or displace elevator 71 upwardly about its hinge axis 71a.

The control operation of the vertical rudder 73 of the tail group G is effected by a control system that includes horizontal crank 83 fixed to the shaft forming spar 73a of the vertical rudder surface 73 disposed transversely of the shaft, and, in this example, being located on the shaft 73a beneath the rear end of the boom 64 and between the underside of the boom and the upper side of the lower section 73f of the rudder 73. This crank 83 is secured in fixed position on the shaft 73a, at right angles to the vertical plane of the rudder surface 73. A crank 84, referring now to Figs. 16, 17 and 22 in particular, is mounted in vertically disposed position within the forward end 64a of the left-hand boom 64 for rocking about a horizontal axis 84a disposed transversely of boom 64 (see Fig. 17), which axis 84a may be formed by an extension of the shaft 82a on which the elevator crank 82 is mounted, as described hereinbefore. Crank 84 is generally similar to the elevator crank 82 and may, as in this example, be mounted on a common shaft, such as shaft or pin 82a, for rocking about the same axis, as will be clear by reference to Fig. 22 of the drawings. The crank 83 on the rudder shaft 73a is operatively connected with the crank 84 at the forward end of the left-hand outrigger boom 64, by the operating cables 84b and 84c which are connected to and extend between the opposite ends of these cranks 83 and 84. For example, as shown particularly by Figs. 16 and 22 of the drawings, the cable 84b is connected at its forward end to the upper end of crank 84 and extends rearwardly through boom 64 and is connected at its rear end to the outer end of the left-hand arm of rudder crank 83, and a cable 84c is connected at its forward end to the lower end of crank 84 and extends rearwardly through the boom 64, crossing cable 84b in the boom, and is connected at its rear end to the end of the right-hand arm of rudder crank 83. These rudder operating cables 84b and 84c extend rearwardly through boom 64 from the crank 84 to the rudder operating crank 83, and, if desired or found expedient, suitable guide pulleys or rollers 84d, referring now to Fig. 21 of the drawings in particular, may be provided at the rear end of boom 64 to suitably position the cables 84b and 84c in the boom and to guide these cables from the rear end of the boom 64 to the opposite ends, respectively of the rudder crank 83. An operating link 85 is provided for rocking crank 84 about its axis 84a, and this link 85, in this instance, is pivotally connected at its upper end to the lower end of crank 84 at 85a (see Fig. 17).

The rudder control system as above described, is adapted to be operated through the medium of the link 85 in the following manner: Operation of the link 85 to swing the lower end of crank 84 rearwardly about its axis 84a, draws cable 84b forwardly and moves cable 84c rearwardly to rock the rudder crank 83 to the right or clockwise about the axis of 73a, and thereby laterally swings or displaces the rudder 73 to the left, while operation of the link 85 to swing the lower end of crank 84 forwardly will draw cable 84c forwardly and move cable 84b rearwardly to thereby rock the rudder crank 83 to the left or anti-clockwise and laterally swing or displace the rudder 73 to the right.

*Flight system operating controls on the automobile forming unit*

The automobile or car forming unit A mounts and carries and has permanently installed therein, the pilot actuated controls for operating the hereinbefore described flight control systems which are permanently mounted and installed on and form a part of the flight unit F, and the flight system operating controls of the automobile forming unit A are adapted to be operatively separably associated with the flight control systems of the flight unit F, when the unit F is mounted and attached in position on and in combination with the unit A to convert the latter into the airplane of my invention.

Referring now to Figs. 11, 12, 13 and 16 of the drawings in particular, the shaft 49 is mounted in the automobile unit A disposed horizontally and transversely of the body B across the upper forward portion of the compartment 14 at the left-hand side thereof, being located in a horizontal plane adjacent but spaced below the upper end 22b of the left-hand forward truss FT of the body frame. As hereinbefore referred to and described, the grooved pulley 48 is mounted on and adjacent the outer end of this shaft 49, which pulley is rotated by rotation of the steering wheel 45, through the medium of the endless cable or belt 48a for laterally swinging the front wheel 10 of the automobile unit A for directionally steering the unit A when operated on the ground as an automobile. In the specific example hereof, the steering wheel 45 serves a dual purpose, in that, it provides both the steering wheel for the automobile forming unit A when the latter is converted to an automobile, and the control wheel for laterally controlling the airplane in roll through the medium of the opposite wing ailerons 63, when the unit A is converted to an airplane by the combination therewith of the flight unit F.

The operating control on the automobile forming unit A for the directional flight control system on the flight unit F, in this instance, includes an arm (referring particularly to Fig. 19) 86 fixed to and extending radially from the pulley 48 on the shaft 49, this arm 86 being normally generally horizontally disposed and extending rearwardly from and adjacent the inner side of the pulley 48. Thus, rotation of the pulley 48 on the shaft 49 by rotation of the steering wheel 45, will rock arm 86 vertically upwardly and downwardly about shaft 49 as an axis. A link 86a is pivotally coupled to the outer end of arm 86 and extends upwardly therefrom for rotation vertically upwardly and downwardly by vertical swinging of arm 86.

The operating control in the automobile forming unit A for the flight control system on the flight unit F for controlling the airplane in pitch by vertical displacement of the elevator 71 of the tail group G, is constituted by the unit consisting of the steering wheel 45 and the arms 46 and 47 on which the steering wheel is mounted. The vertical arm 47 of this unit is rotatably mounted and supported on the shaft 49, by a suitable bearing or journal 47a, referring now to Fig. 18 in particular, so that this arm 47 depending from shaft 49, with the horizontally disposed shaft 46 and the steering wheel 45 mounted thereon, may be rocked forwardly and rearwardly as a unit about the axis defined by the shaft 49. An arm 87 is fixed to the bearing or journal 47a for the upper end of shaft 47 and extends rearwardly therefrom and radially relative to shaft 49 for vertical rocking by forward and rearward swinging of arm 47. A link 87a is pivotally connected at its lower end to the rear end of arm 87 and extends upwardly therefrom for vertical up and down actuation by vertical swinging of arm 87 about shaft 49.

The operating control on the automobile forming unit A for actuating the directional flight control system and the vertical rudder 73 of that system, by which the airplane is directionally controlled in flight, is adapted to be operated by the pilot through the medium of a pedal arrangement L, referring to Figs. 6, 7 and 16 of the drawings, in particular, mounted and installed in the compartment 14 of unit A in a position extending upwardly a distance from the floor level of the compartment and spaced forwardly from the clutch pedal 53b and brake pedal 56b, but within easy and comfortable operating reach for the feet of the pilot seated in the driver-pilot seat 16a.

The pedal arrangement L is accordance with my present invention, referring now to Fig. 16, embodies a fixed supporting bracket or pedestal 88 extending upwardly from the floor structure of the compartment 14 of the body B, and having a pivot pin 88a mounted at its upper end in horizontal position disposed transversely of body B and extending outwardly from the inner side of bracket 88. A left-foot pedal 89 is pivotally mounted on the pin 88a at the inner side of bracket 88 for vertical or up and down rocking on and about pin 88a as an axis. A torque shaft 90 is suitably mounted and journaled in horizontal position disposed transversely of the body B to the rear of pedestal 88 and with its axis parallel to the axis of the pivot pin 88a at the upper end of pedestal 88. A right-foot pedal 91 is fixed at its lower end to the inner end of torque shaft 90 and extends radially upwardly from shaft 90 along the right-hand side of and generally parallel to the left-foot pedal 89, so that forward and rear rocking of pedal 91 will result in rocking of the torque shaft 90 to which pedal 91 is fixed. The pedals 89 and 91 are suitably operatively associated with suitable mechanism for causing movements of the pedals 89 and 91 in reverse or opposite directions. For example, in the specific example hereof the left-foot pedal 89 is provided with a rearward extension 89a at its lower end, and a connecting link 92 is pivotally coupled at its rear end to the end of pedal extension 89a, and this link 92 extends generally horizontally forwardly to and is pivotally connected or coupled at its forward end at 91a to the side of right-foot pedal 91 adjacent thereto, as will be clear by reference to Fig. 16 of the drawings.

The outer end of the transversely disposed torque shaft 90 has a forwardly extended crank 90a fixed thereto for vertical, up and down swinging by rotation of shaft 90, and the forward end of crank 90a is pivotally connected to the lower end of a lever or actuating rod 93 which extends upwardly therefrom to the upper forward portion of the compartment 14 adjacent the shaft 49.

By the foregoing arrangement of the pedals 89 and 91, forward movement of the right pedal 91 rotates torque shaft 90 forwardly to swing crank 90a and the actuating rod 93 upwardly, while the left pedal 89 is moved rearwardly due to the action of the connecting link 92 coupled to left pedal 89 at a point below the axis of swing of pedal 89 about pin 88a. However, forward movement of the left pedal 89 will, through the connecting link 92, cause rearward movement of the right pedal 91 and thus result in rotation of the torque shaft 90 rearwardly to swing crank 90a and the actuating rod 93 downwardly, that is, in a direction opposite to the direction in which such members are swung by the forward movement of the right pedal 91.

*Separable association of flight unit carried control systems with automobile carried operating controls*

Following the teachings of my present invention, provision is made for automatically operatively associating the flight control systems, which are mounted on and carried by the flight unit F, with the pilot actuated operating controls for such systems, which are carried by and mounted on the automobile forming unit A, when the flight unit F is mounted on and attached to the automobile forming unit A, to form the airplane.

An example of an arrangement of mechanism for carrying out and effecting such automatic, separable association is disclosed in the accompanying drawings, and particularly in Figs. 11 to 19, inclusive, thereof. In the illustrated example, a housing 95 is mounted at the underside of the forward end of the left-hand outrigger boom 64 of the flight unit F, and this housing 95 has its under or lower side completely open and unobstructed. A generally similar housing 96 is mounted on the left-hand side of the frame structure of the automobile or car forming unit A, and is located thereon at the inner side of the longitudinal side brace rod 27 adjacent the upper end structure 22b of the left-hand forward truss FT. The upper side of the housing 96 on the automobile unit A is substantially completely open and unobstructed. The position of housing 96 is such that when the flight unit F is mounted in position on the automobile forming unit A, the housing 95 will fit down onto the housing 96, with the walls of the housings 95 and 96 in vertical alignment to form a substantially closed housing or casing unit formed of the upper housing section 95 and the lower housing section 96.

Crank plates 1a, 1c and 1b, are mounted within the housing 95 of the flight unit F, in positions disposed generally longitudinally of the flight unit, and are spaced apart transversely of the housing in substantially parallel relation for vertical rocking about a transverse shaft or pivot pin 95a (see Figs. 14 and 15) secured in position within the housing 95 and extending therewith transversely across the lower side thereof. Above each of the crank plates 1a, 1c and 1b, an arm 97 is pivotally mounted on a horizontal pivot pin 97a disposed transversely of housing 95, and such arm 97 extends forwardly and downwardly over and along the upper longitudinal side or edge of that portion of the respective crank plate positioned therebelow that is forward of the crank plate pivot pin 95a. A similar arm 98 is pivotally mounted at its forward upper end above each crank plate 1a, 1c and 1b, on a horizontal pivot pin 98a disposed transversely of the crank plate therebelow, and such arm extends rearwardly and downwardly over and along the upper longitudinal side or edge of that portion of the crank plate that is to the rear of the pivot pin 95a, as will be clear by reference to Figs. 14 and 15 of the drawings. An expansion spring 97b, of the coil type, is interposed between the forward arm 97 of each crank plate 1a, 1c and 1b, and the upper wall of the housing 95, and a similar spring 98b is interposed between the rear arm 98 above each of the crank plates and the upper wall of the housing 95. These expansion springs 97b and 98b function to continuously exert downwardly acting forces on the forward and rear arms 97 and 98 above each crank plate 1a, 1c and 1b, respectively, to force the arms into engagement with the upper side or edge of each crank plate at opposite sides of the pivot pin or shaft 95a, to thereby normally center each crank plate in horizontally disposed, neutral position, and thus to maintain each crank plate against inadvertent vertical rocking from such centered, neutral position, as will be clear by reference to Fig. 15 of the drawings, in which the spring loaded centering arms 97 and 98 for the crank plate 1a are shown in depressed, downwardly swung positions engaging the crank plate 1a and holding the same in its normal neutral, horizontally disposed position, against inadvertent vertical rocking on the pivot pin or shaft 95a.

A series of crank plates 2a, 2c and 2b, generally similar and complementary to cranks 1a, 1c and 1b, are mounted in the crank housing 96 which is carried on the automobile forming unit A. The crank plates 2a, 2c and 2b, are mounted in position disposed longitudinally of the housing 96, and in spaced, parallel relation transversely of the housing, for vertical rocking about a pivot pin or shaft 96a which is mounted extending transversely across the upper side of housing 96, with the crank plates 2a, 2c and 2b pivotally mounted on the shaft 96a at the upper sides of the plates, so that, these crank plates are, in effect, suspended or depend from the pivot pin or shaft 96a. The crank plates 2a, 2c and 2b are similar and complementary to the crank plates 1a, 1c and 1b, respectively, which are mounted in the housing 95 of the flight unit F, and are also of generally the same dimensions and spaced apart laterally or transversely of the housing 96 the same distances, as the crank plates 1a, 1c and 1b, so that, the crank plates 2a, 2c and 2b, will be vertically aligned with the crank plates 1a, 1c and 1b, respectively, when the housing 96 is placed over and down onto and is aligned with the housing 96.

Each of the crank plates 2a, 2c and 2b, in the housing 96 on the automobile forming unit A, is provided with vertically disposed bearing pins 96b mounted therein adjacent the opposite ends thereof, respectively, for vertical sliding movements in the crank plate. Each of these pins 96b is provided with an expansion spring 96c interposed between the head of the pin and the upper surface of the crank plate therebelow, which springs function to normally exert forces on the pins to maintain the pins in their positions of maximum upward movement from the crank plate in which mounted.

The crank plates 1a, 1c and 1b, mounted in the crank housing 95 on the flight unit F, are each provided with vertically disposed contact pins 95b depending from the under surface or lower edge thereof adjacent the opposite ends, respectively, of the crank plate. The contact pins 95b are positioned and located on each crank plate 1a, 1c and 1b, so as to be in alignment with and engage the bearing pins 96b, respectively, of the crank plates 2a, 2c and 2b, mounted within the housing 96 on automobile unit A, when the housings 95 and 96 are joined together by mounting the flight unit F on the automobile unit A. Each of the contact pins 95b may if desired be provided with a roller or contact member 95c at the lower end thereof, for anti-friction contact with the upper end of the contact pin 96b engaged thereby and therewith.

The centering and holding arms 97 and 98 for each of the crank plates 1a, 1c and 1b, in housing 95, are automatically forced or pressed upwardly against the springs 97b and 98b when the housing 95 is mounted and joined with the housing 96, by the engagement of the lower ends 97c of the forward arms 97 with a shoulder or shoulders 96d formed at the forward upper side of housing 96, and by the engagement of the lower ends 98c of the rear arms 98, with a similar shoulder or shoulders 96e provided at the upper, rear portion of the housing 96.

Thus, when the flight unit F is attached in mounted position on the automobile forming unit A, the housings 95 and 96 are aligned and joined together into the position shown in Fig. 14 of the drawings, to form a substantially closed crank case or housing, with the centering arms 97 and 98 for each of the crank plates 1a, 1c and 1b, forced upwardly by shoulders 96d and 96e of housing 96, to inactive positions releasing crank plates 1a, 1c and 1b for vertical rocking about the pivot pin or shaft 95a. Crank plates 1a, 1c and 1b are in vertical alignment with the crank plates 2a, 2c and 2b, respectively, in the housing 96 therebelow, with the bearing pins 95b of the crank plates 1a, 1c and 1b, in engagement with the contact pins 96b respectively, of each of the crank plates 2a, 2c and 2b, the heads of the contact pins 96b being forced a distance downwardly against springs 96c, so that these springs act to maintain firm operating engagement between the aligned and engaged crank plates through the medium of the engaged bearing pins 95b and contact pins 96b. Thus, vertical rocking of a lower crank plate 2a, 2c or 2b about the axis 96a, will, when operatively engaged by and with the upper crank plate 1a, 1c or 1b, respectively aligned therewith, cause vertical rocking or swinging of the respective upper crank plate about the horizontal axis 95a, the arrangement being such that the lower crank plates may be selectively vertically rocked to selectively vertically rock or swing the corresponding upper crank plate engaged thereby.

In the present example, the crank plates 1a and 2a, when in engaged operative association, transmit movements of the operating control in the automobile unit A for actuating the yaw or directional flight control system in the flight unit F; the crank plates 1b and 2b when in operative engagement transmit movements from the operating control in the automobile unit A for actuating the lateral or roll control flight system in the flight unit F; and the crank plates 1c and 2c when in operative engagement transmit movements from the operating control in the automobile unit A for actuating the pitch flight control system in the flight unit F.

In carrying out such a transmission of movements through the series of crank plates, the actuating rod 93, referring now to Fig. 16 of the drawings, is pivotally coupled at its upper end to the forward end of the lower crank plate 2a, while the link 85 from the crank 84 in the forward end 84a of boom 64, is pivotally coupled at its lower end to the forward end of the crank plate 1a, thus completing the operative association of the rudder pedals 89 and 91 in the automobile unit A with the yaw or directional flight control system for actuating the rudder 73 of the tail group G of flight unit F.

The link 86a, which is coupled to the vertically rocking arm 86 extending from pulley 48, is pivotally coupled at its upper end to the forward end of crank plate 2b, while the link 81 which depends from the long arm of crank 77 is pivotally coupled at its lower end to the forward end of upper crank plate 1b, thus completing the operative association between the steering wheel 45 in the automobile unit A and the opposite wing ailerons 63 of the roll or lateral flight control system of the flight unit F.

The link 87a which is coupled to the outer end of arm 87 carried by the vertical arm 47 of the steering wheel unit, is pivotally coupled at its upper end to the forward end of crank plate 2c, and the link 82e which depends from the arm 82d extending forwardly from crank 82 mounted in the forward end of outrigger boom 64, is pivotally coupled at its lower end to the forward end or upper crank plate 1c, thus completing the operative association between the forwardly rockable arm 47 of the steering wheel unit, and the elevator 71 of the pitch flight control system of the flight unit F.

By the provision of the spring loaded centering arms 97 and 98 for the crank plates 1a, 1b and 1c, on the flight unit F, when the flight unit is detached and removed from the automobile forming unit A, the flight control systems which are operatively coupled and connected with such crank plates, are automatically returned or actuated to neutral control positions, so that, the control surfaces of such systems, that is, the opposite wing aileron 63, the elevator 71, and the vertical rudder 73, are automatically moved into their neutral positions and maintained in such positions against swinging or rocking in the handling and transportation of the flight unit F. In this manner the possibility of damage or injury to the control surfaces of the flight unit, is reduced to a minimum.

*The airplane of the convertible car airplane (Flight unit combined with the automobile forming unit)*

With the automobile or car forming unit A and the flight unit F, of the present example of a convertible car airplane of my invention, each designed, arranged and constructed as hereinbefore described and explained, the airplane of the convertible car airplane is formed by mounting the flight unit F on and detachably securing the same to the automobile unit A, which unit A then forms and functions as the landing gear and body or fuselage of the airplane.

In the instant example, the upper end structures 22b of the front trusses FT and 25b of the rear trusses RT, of the frame structure of the automobile forming unit A, provide the spaced opposite side attachment point for the flight unit F. In carrying out this purpose, the upper end structure 22b of each forward truss FT, referring now to Fig. 10 of the accompanying drawings, provides and includes a bifurcated, forked or clevis fitting 100. Each clevis fitting 100, referring now specifically to Fig. 8 of the accompanying drawings, includes the spaced vertical side wall forming plates 101 disposed generally longitudinally of the body B and substantially parallel with the longitudinal side brace rods 27 at the upper end of the frame, thus providing, in effect, a socket or space between the side walls open at the upper side thereof. In this example, the inner side wall or plate 101 is provided with a transverse bore 102 therethrough which is internally screw-threaded, and the outer side wall forming plate 101 is provided with a bore 103 transversely therethrough in axial alignment with the bore 102 of the inner wall forming plate 101.

Each upper end structure 25b of the opposite side rear trusses RT, also includes and provides a clevis fitting 104, generally similar to the clevis fittings 100 at the upper ends of front trusses FT. Each fitting 104 includes the wall forming vertical plates 101 disposed longitudinally of the frame structure of the body B and spaced apart laterally to provide a socket forming space therebetween open and unobstructed at the upper side thereof. These wall forming plates 101 are provided with transverse bores 102 and 103 therethrough in axial alignment, similar to the bores of the fitting 100 at the upper end of the front trusses FT, referring now to Fig. 10 of the drawings in particular.

The flight unit F is mounted on and across the upper side of the frame structure formed by the opposite side front trusses FT and the opposite side rear trusses RT, with the spar section 62 between the wings 60 extending between and across the upper ends of the front trusses FT, and with the opposite wings 60 extending of the flight unit F, and this housing 95 has its under or lower side completely open and unobstructed. A generally similar housing 96 is mounted on the left-hand side of the frame structure of the automobile or car forming unit A, and is located thereon at the inner side of the longitudinal side brace rod 27 adjacent the upper end structure 22b of the left-hand forward truss FT. The upper side of the housing 96 on the automobile unit A is substantially completely open and unobstructed. The position of housing 96 is such that when the flight unit F is mounted in position on the automobile forming unit A, the housing 95 will fit down onto the housing 96, with the walls of the housings 95 and 96 in vertical alignment to form a substantially closed housing or casing unit formed of the upper housing section 95 and the lower housing section 96.

Crank plates 1a, 1c and 1b, are mounted within the housing 95 of the flight unit F, in positions disposed generally longitudinally of the flight unit, and are spaced apart transversely of the housing in substantially parallel relation for vertical rocking about a transverse shaft or pivot pin 95a (see Figs. 14 and 15) secured in position within the housing 95 and extending therewith transversely across the lower side thereof. Above each of the crank plates 1a, 1c and 1b, an arm 97 is pivotally mounted on a horizontal pivot pin 97a disposed transversely of housing 95, and such arm 97 extends forwardly and downwardly over and along the upper longitudinal side or edge of that portion of the respective crank plate positioned therebelow that is forward of the crank plate pivot pin 95a. A similar arm 98 is pivotally mounted at its forward upper end above each crank plate 1a, 1c and 1b, on a horizontal pivot pin 98a disposed transversely of the crank plate therebelow, and such arm extends rearwardly and downwardly over and along the upper longitudinal side or edge of that portion of the crank plate that is to the rear of the pivot pin 95a, as will be clear by reference to Figs. 14 and 15 of the drawings. An expansion spring 97b, of the coil type, is interposed between the forward arm 97 of each crank plate 1a, 1c and 1b, and the upper wall of the housing 95, and a similar spring 98b is interposed between the rear arm 98 above each of the crank plates and the upper wall of the housing 95. These expansion springs 97b and 98b function to continuously exert downwardly acting forces on the forward and rear arms 97 and 98 above each crank plate 1a, 1c and 1b, respectively, to force the arms into engagement with the upper side or edge of each crank plate at opposite sides of the pivot pin or shaft 95a, to thereby normally center each crank plate in horizontally disposed, neutral position, and thus to maintain each crank plate against inadvertent vertical rocking from such centered, neutral position, as will be clear by reference to Fig. 15 of the drawings, in which the spring loaded centering arms 97 and 98 for the crank plate 1a are shown in depressed, downwardly swung positions engaging the crank plate 1a and holding the same in its normal neutral, horizontally disposed position, against inadvertent vertical rocking on the pivot pin or shaft 95a.

A series of crank plates 2a, 2c and 2b, generally similar and complementary to cranks 1a, 1c and 1b, are mounted in the crank housing 96 which is carried on the automobile forming unit A. The crank plates 2a, 2c and 2b, are mounted in position disposed longitudinally of the housing 96, and in spaced, parallel relation transversely of the housing, for vertical rocking about a pivot pin or shaft 96a which is mounted extending transversely across the upper side of housing 96, with the crank plates 2a, 2c and 2b pivotally mounted on the shaft 96a at the upper sides of the plates, so that, these crank plates are, in effect, suspended or depend from the pivot pin or shaft 96a. The crank plates 2a, 2c and 2b are similar and complementary to the crank plates 1a, 1c and 1b, respectively, which are mounted in the housing 95 of the flight unit F, and are also of generally the same dimensions and spaced apart laterally or transversely of the housing 96 the same distances, as the crank plates 1a, 1c and 1b, so that, the crank plates 2a, 2c and 2b, will be vertically aligned with the crank plates 1a, 1c and 1b, respectively, when the housing 96 is placed over and down onto and is aligned with the housing 96.

Each of the crank plates 2a, 2c and 2b, in the housing 96 on the automobile forming unit A, is provided with vertically disposed bearing pins 96b mounted therein adjacent the opposite ends thereof, respectively, for vertical sliding movements in the crank plate. Each of these pins 96b is provided with an expansion spring 96c interposed between the head of the pin and the upper surface of the crank plate therebelow, which springs function to normally exert forces on the pins to maintain the pins in their positions of maximum upward movement from the crank plate in which mounted.

The crank plates 1a, 1c and 1b, mounted in the crank housing 95 on the flight unit F, are each provided with vertically disposed contact pins 95b depending from the under surface or lower edge thereof adjacent the opposite ends, respectively, of the crank plate. The contact pins 95b are positioned and located on each crank plate 1a, 1c and 1b, so as to be in alignment with and engage the bearing pins 96b, respectively, of the crank plates 2a, 2c and 2b, mounted within the housing 96 on automobile unit A, when the housings 95 and 96 are joined together by mounting the flight unit F on the automobile unit A. Each of the contact pins 95b may if desired be provided with a roller or contact member 95c at the lower end thereof, for anti-friction contact with the upper end of the contact pin 96b engaged thereby and therewith.

The centering and holding arms 97 and 98 for each of the crank plates 1a, 1c and 1b, in housing 95, are automatically forced or pressed upwardly against the springs 97b and 98b when the housing 95 is mounted and joined with the housing 96, by the engagement of the lower ends 97c of the forward arms 97 with a shoulder or shoulders 96d formed at the forward upper side of housing 96, and by the engagement of the lower ends 98c of the rear arms 98, with a similar shoulder or shoulders 96e provided at the upper, rear portion of the housing 96.

Thus, when the flight unit F is attached in mounted position on the automobile forming unit A, the housings 95 and 96 are aligned and joined together into the position shown in Fig. 14 of the drawings, to form a substantially closed crank case or housing, with the centering arms 97 and 98 for each of the crank plates 1a, 1c and 1b, forced upwardly by shoulders 96d and 96e of housing 96, to inactive positions releasing crank plates 1a, 1c and 1b for vertical rocking about the pivot pin or shaft 95a. Crank plates 1a, 1c and 1b are in vertical alignment with the crank plates 2a, 2c and 2b, respectively, in the housing 96 therebelow, with the bearing pins 95b of the crank plates 1a, 1c and 1b, in engagement with the contact pins 96b respectively, of each of the crank plates 2a, 2c and 2b, the heads of the contact pins 96b being forced a distance downwardly against springs 96c, so that these springs act to maintain firm operating engagement between the aligned and engaged crank plates through the medium of the engaged bearing pins 95b and contact pins 96b. Thus, vertical rocking of a lower crank plate 2a, 2c or 2b about the axis 96a, will, when operatively engaged by and with the upper crank plate 1a, 1c or 1b, respectively aligned therewith, cause vertical rocking or swinging of the respective upper crank plate about the horizontal axis 95a, the arrangement being such that the lower crank plates may be selectively vertically rocked to selectively vertically rock or swing the corresponding upper crank plate engaged thereby.

In the present example, the crank plates 1a and 2a, when in engaged operative association, transmit movements of the operating control in the automobile unit A for actuating the yaw or directional flight control system in the flight unit F; the crank plates 1b and 2b when in operative engagement transmit movements from the operating control in the automobile unit A for actuating the lateral or roll control flight system in the flight unit F; and the crank plates 1c and 2c when in operative engagement transmit movements from the operating control in the automobile unit A for actuating the pitch flight control system in the flight unit F.

In carrying out such a transmission of movements through the series of crank plates, the actuating rod 93, referring now to Fig. 16 of the drawings, is pivotally coupled at its upper end to the forward end of the lower crank plate 2a, while the link 85 from the crank 84 in the forward end 64a of boom 64, is pivotally coupled at its lower end to the forward end of the crank plate 1a, thus completing the operative association of the rudder pedals 89 and 91 in the automobile unit A with the yaw or directional flight control system for actuating the rudder 73 of the tail group G of flight unit F.

The link 86a, which is coupled to the vertically rocking arm 86 extending from pulley 48, is pivotally coupled at its upper end to the forward end of crank plate 2b, while the link 81 which depends from the long arm of crank 77 is pivotally coupled at its lower end to the forward end of upper crank plate 1b, thus completing the operative association between the steering wheel 45 in the automobile unit A and the opposite wing ailerons 63 of the roll or lateral flight control system of the flight unit F.

The link 87a which is coupled to the outer end of arm 87 carried by the vertical arm 47 of the steering wheel unit, is pivotally coupled at its upper end to the forward end of crank plate 2c, and the link 82e which depends from the arm 82d extending forwardly from crank 82 mounted in the forward end of outrigger boom 64, is pivotally coupled at its lower end to the forward end or upper crank plate 1c, thus completing the operative association between the forwardly rockable arm 47 of the steering wheel unit, and the elevator 71 of the pitch flight control system of the flight unit F.

By the provision of the spring loaded centering arms 97 and 98 for the crank plates 1a, 1b and 1c, on the flight unit F, when the flight unit is detached and removed from the automobile forming unit A, the flight control systems which are operatively coupled and connected with such crank plates, are automatically returned or actuated to neutral control positions, so that, the control surfaces of such systems, that is, the opposite wing aileron 63, the elevator 71, and the vertical rudder 73, are automatically moved into their neutral positions and maintained in such positions against swinging or rocking in the handling and transportation of the flight unit F. In this manner the possibility of damage or injury to the control surfaces of the flight unit, is reduced to a minimum.

*The airplane of the convertible car airplane (Flight unit combined with the automobile forming unit)*

With the automobile or car forming unit A and the flight unit F, of the present example of a convertible car airplane of my invention, each designed, arranged and constructed as hereinbefore described and explained, the airplane of the convertible car airplane is formed by mounting the flight unit F on and detachably securing the same to the automobile unit A, which unit A then forms and functions as the landing gear and body or fuselage of the airplane.

In the instant example, the upper end structures 22b of the front trusses FT and 25b of the rear trusses RT, of the frame structure of the automobile forming unit A, provide the spaced opposite side attachment point for the flight unit F. In carrying out this purpose, the upper end structure 22b of each forward truss FT, referring now to Fig. 10 of the accompanying drawings, provides and includes a bifurcated, forked or clevis fitting 100. Each clevis fitting 100, referring now specifically to Fig. 8 of the accompanying drawings, includes the spaced vertical side wall forming plates 101 disposed generally longitudinally of the body B and substantially parallel with the longitudinal side brace rods 27 at the upper end of the frame, thus providing, in effect, a socket or space between the side walls open at the upper side thereof. In this example, the inner side wall or plate 101 is provided with a transverse bore 102 therethrough which is internally screw-threaded, and the outer side wall forming plate 101 is provided with a bore 103 transversely therethrough in axial alignment with the bore 102 of the inner wall forming plate 101.

Each upper end structure 25b of the opposite side rear trusses RT, also includes and provides a clevis fitting 104, generally similar to the clevis fittings 100 at the upper ends of front trusses FT. Each fitting 104 includes the wall forming vertical plates 101 disposed longitudinally of the frame structure of the body B and spaced apart laterally to provide a socket forming space therebetween open and unobstructed at the upper side thereof. These wall forming plates 101 are provided with transverse bores 102 and 103 therethrough in axial alignment, similar to the bores of the fitting 100 at the upper end of the front trusses FT, referring now to Fig. 10 of the drawings in particular.

The flight unit F is mounted on and across the upper side of the frame structure formed by the opposite side from trusses FT and the opposite side rear trusses RT, with the spar section 62 between the wings 60 extending between and across the upper ends of the front trusses FT, and with the opposite wings 60 extending laterally from opposite sides of the automobile forming unit A. In this mounted position of flight unit F, the forward ends of the spaced outrigger booms 64 are located and extend along the opposite sides of the frame structure between the forward trusses FT and the rear trusses RT at each side, respectively, of the frame, with the outrigger booms 64 extended rearwardly from the unit A to locate and position the tail group or empennage G spaced the required distance to the rear of unit A.

In mounted position of the flight unit F on and across the upper side of the frame structure of the automobile unit A, the attachment arm 66 at the forward end of the left-hand boom 64 and the attachment lug 68a which depends from the wing spar 61—62 adjacent the forward end of the left-hand spar, are received and seated as a unit in the clevis fitting 100 at the upper end of the left-hand forward truss FT, while the attachment arm 66 at the forward end of the right-hand wing boom 64 and the attachment lug 68a depending from the wing spar 61—62 adjacent the attachment arm 66 at the forward end of the right-hand boom, are received and seated as a unit in the clevis fitting 100 at the upper end of the front truss FT at the right-hand side of the frame structure of unit A. In this mounted position of the flight unit F, the attachment lug 69 at the inner, underside of the right-hand outrigger boom 64 is so positioned spaced rearwardly from the forward end 64a of the boom as to be received and seated in the clevis fitting 104 at the upper end of right-hand rear truss RT, while the corresponding attachment lug 69 on the left-hand boom 64 is correspondingly positioned to be received by and seated in the clevis fitting 104 at the upper end of the left-hand rear truss RT of the frame structure unit A. Thus, with the flight unit F in mounted position on automobile unit A, the attachment members of the flight unit are received and seated in positions for attachment on and to that unit, at the four (4) attachment points, respectively, provided thereon by the forward clevis fittings 100 and the rear clevis fittings 104, of the spaced forward trusses FT and the spaced rear trusses RT.

The flight unit F is detachably secured and attached in mounted position at the four (4) attachment points, as aforesaid, on the automobile forming unit A, in the specific example hereof, by means of attachment pins M, or the like. Referring now to Figs. 8 and 9 of the accompanying drawings, in which the example of a design and construction of such an attachment pin M is disclosed in detail, the pin includes a shank 105 having a knurled barrel or cylindrical head 106 at one end thereof in longitudinal or axial continuation of the shank, with the shank 105 decreasing in diameter and tapering outwardly from the head 106.

The cylindrical head 106 is of greater external diameter than the maximum external diameter of the shank 105 at its inner or base end at the adjacent end of head 106, and the shank is provided with external screw threading 107 around its inner base end extending a distance outwardly therealong from the head 106. The pin M is provided with a spring loaded locking latch 108 which is suitably reciprocably mounted in a longitudinal bore 109 extending through head 106 from end to end thereof, parallel with the longitudinal axis of head 106 but spaced a distance radially outwardly in the head. This bore 109 which receives the latch 108 is of enlarged diameter at its outer length to provide a chamber 110 which receives a coiled compression spring 111 therein. The latch 108 is mounted in and extending through bore 109 and axially through the spring 111, which spring is confined in position in chamber 110 by a ring member 112 threaded thereinto at the outer end of the spring chamber 110, and the latch 108 is provided with an annular shoulder or flange therearound intermediate its length which engages and against which the inner end of spring 111 seats. The outer end of latch 108 is provided with a head 114 for manual operation of the latch, while the opposite or inner end of the latch extends a distance outwardly beyond the inner end of head 106 spaced from the adjacent externally threaded portion 107 of the shank 105 but disposed in position parallel with the axis of the shank.

The locking latch 108 of the pin M, is normally forced and held in operative locking position projected from the inner end of head 106 by the spring 111, and is actuated to releasing or unlocking position by manually grasping head 114 and drawing the latch outwardly through the bore 109 in head 106, against the forces of and compressing spring 111. Upon release of head 114, spring 111, being under compression, expands and instantly returns the latch to its projected locking position.

The flight unit F is detachably secured and attached in mounted position on the automobile unit A, in this example, by utilizing a locking pin M at each of the four (4) attachment points provided by the spaced, forward clevis fitting 100 and the spaced, rear clevis fittings 104 at the upper ends of the forward trusses FT and the rear trusses RT. In mounted position of the flight unit F, the attachment members 66—68a positioned at the forward end of each outrigger boom 64 and the adjacent portion of the wing spar 61—62, are received in the clevis fitting 100 respectively located therebelow, with the transverse bore 68a of the attachment members aligned with the bores 102—103 of the clevis fitting 100 in which the attachment members are received and seated (see Fig. 8); while the attachment ears or lugs 69 on the opposite outrigger boom 64 are received and seated in the clevis fitting 104, respectively, at the upper ends of the rear trusses RT, with the transverse bores 69a (see Fig. 10) thereof axially aligned with the bores 102—103 of the clevis fittings 104. A locking pin M is inserted in and extended through the aligned bores of the attachment members and of the forward clevis fitting 100 in which said members are respectively received and seated, and a locking pin M is inserted in and extended through the aligned bores of each attachment lug 69a and of each of the rear clevis fittings 104 in which said lugs are respectively received and seated. The locking pins M are preferably inserted into locking position from the inner side of each of the clevis fittings 100 and 104, as clearly indicated in Fig. 10 of the drawings.

The operation of each locking pin M is identical, and is shown in Fig. 8 of the accompanying drawings in connection with the attachment of one of the sets of forward attachment members 66—68a, to one of the forward clevis fittings 100, such Fig. 8 serving as an illustration of the operation and attaching and locking position for the locking pins M at each of the attachment points, respectively. Referring to Fig. 8, the pin M is inserted from the inner side of the clevis fitting 100, with the tapered shank 105 of the pin extending outwardly through the aligned bores 102—68a—103 of the attachment members 66—68a and the clevis fitting 100, these aligned bores uniformly decreasing in internal diameter outwardly to provide a taper corresponding and complementary to the taper of the shank 105. The pin M is primarily secured in attaching position by the engaged external screw threading 107 at the inner end of shank 105, and internal threading of the bore 102 through the inner wall 101 of clevis fitting 100, with the annular inner end face of head 106 surrounding the inner end of shank 105, bearing and seated against the inner face or surface of the clevis wall 101. The pin M is then releasably locked against any rotation which might inadvertently release the engaged threading as aforesaid, by the engagement and seating of the projected end of the spring loaded latch 108 with and in a suitably located bore or recess 108a provided in the inner wall 101 of clevis fitting 100 and opening through the outer side thereof, as will be clear by reference to Fig. 8 of the drawings. When it is desired to unlock and remove a locking pin M to release the attachment members for removal thereof from a clevis fitting, it is only necessary to withdraw spring loaded latch 108 outwardly until the projected end thereof is removed from locking engagement with the bore 108a in the clevis wall, and then rotate pin M by head 106 until the threading 107 is disengaged, whereupon the pin M may be completely withdrawn in its entirety from the clevis and the attachment members therein to detach and release the attachment members for removal from the clevis fitting.

Thus, the attachment and mounting of the flight unit F into the proper position on and relative to the automobile unit A to form and complete the airplane, is accomplished merely by attaching the flight unit to the four (4) attachment points at the upper side of the frame structure of the unit A, through the medium of the detachable locking pins M. By the design and arrangement of the flight unit F, including the outrigger booms 64, and the location of the flight unit attachment points at the opposite upper sides of the frame structure of the automobile unit A, the booms 64 which support the tail group G at their outer rear end, have the forward lengths of the booms located along the opposite sides of the frame structure of the automobile unit A which forms the fuselage or body for the airplane, so as to take advantage of the side trusses of such frame structure for the support of the outrigged tail group, as well as for the support of the opposite wings 60 of the flight unit F. The use of the quickly detachable locking pins M makes it possible to quickly and easily mount the flight unit F in proper position on the automobile forming unit A, and to as easily and quickly detach and remove the unit to convert the unit A to the conventional automobile or car, as hereinbefore described.

The desired angle of incidence of the opposite wings 60 with the vehicle converted to the airplane by mounting and attaching the flight unit F of the particular example hereof, to the automobile forming unit A, is determined by the vertical angular relationship between the opposite wings 60 and the continuous wing spar 61—62 thereof, and the horizontal plane of the longitudinal axes of the parallel, generally horizontally disposed outrigger booms 64. In the preferred design and construction embodiments of the flight unit F of my invention, it is not necessary or essential that the root ends 60a of the opposite wings 60 of the flight unit F be directly attached to the sides of the forward end lengths of the outrigger booms 64. As to this feature, my invention provides for the non-attachment of the wing roots 60a to the outrigger booms 64, with the outrigger booms only attached directly to the main spar 61—62 of the wings 60 at the forward ends of the booms, through the medium of the links 67 and attachment arms 66 with the lugs 68a respectively associated therewith, by providing sleeve members 66a (see Fig. 10) adapted to be secured in and to extend through the aligned bores 68a of the attachment members 66—68a at the forward end 64a of each boom, to secure these members together while providing a bore therethrough for receiving a detachable locking pin, such as the pin M hereinbefore disclosed and described. Such sleeves may be tapered externally to fit into the tapered bores of the attachment members, and internally tapered to receive and fit the tapered shank 105 of a pin M.

When the car-airplane is converted to an airplane by mounting and combining the flight unit F thereon and therewith, the automobile unit A then forms and functions as the landing gear and body or fuselage of the airplane. Referring now to Figs. 1, 2 and 7 of the drawings in particular, it will be noted that in the specific example of the invention herein disclosed, the flight unit F is preferably provided with a leading edge member 62a which is supported in fixed position over and across the central spar section 62 between the inner or root ends of the leading edge sections of the opposite wings 60, this leading edge section 62a being supported by tube members or arms 62b extending forwardly from the forward ends 64a of the outrigger booms 64, and over and across the upper side of the center section 62 of the wing spar 61—62, as will be clear by reference to Fig. 10 of the drawings. This leading edge section or member 62a fits down on and extends across the windshield 15, with the forward central portion of the windshield extending a distance vertically over and across this leading edge member, as more or less diametrically illustrated by Figs. 1 and 2 of the accompanying drawings. If desired or found expedient a suitable covering not shown may be provided to close the upper side of the compartment 14, which covering may extend rearwardly from the upper surface of the leading edge members 62a over and across the forward end lengths of the outrigger booms 64 above the compartment 14 and between the root ends 60a of the opposite wings 60.

The automobile unit A has a substantial wheel base to meet road vehicle requirements, and when the automobile unit A is converted to form and function as the running gear and body or fuselage of the airplane, the center of gravity location, as hereinbefore described and referred to, is indicated in Fig. 7 of the drawings so that the rear wheels 11 are located a considerable distance to the rear of such center of gravity, namely a distance such that the rear wheels 11 are located at an angle of approximately fifty degrees (50°) to the rear of the center of gravity, that is, fifty degrees (50°) rearwardly from a vertical line projected or passing through the center of gravity. In order to convert such a running gear to meet the landing gear conditions and requirements in the present design of convertible car-airplane of my invention, and permit of the airplane attaining a sufficient angle of attack to enable the airplane to take off while remaining in its normal ground attitude without bodily rotating the airplane about its center of gravity to elevate the froward or nose end thereof to a position increasing the wing angle of attack to a degree to enable the airplane to take off, the opposite wings 60 of the flight unit F are so mounted and adjusted and positioned in that unit that when the unit is mounted and attached on the automobile unit A, the wings 60 will be set at a relatively high angle of incidence, say of approximately or of the order of twelve degrees (12°) so that, a sufficient lift will be developed by the wings for take off. In this manner the substantial wheel base essential for efficient automotive functioning is retained for the automobile unit A, and this automobile running gear of the automobile unit A is convertible to fully efficient airplane landing gear functioning without change or compromise in the automobile unit. With such a relatively high angle of incidence for the opposite wings 60, the airplane in normal flight attitude will be actually at a negative angle of approximately or of the order of, three to four degrees (3° to 4°) but this condition and result has a definite advantage, in that, not only does the pilot have better vision forwardly over the nose of the airplane when in flight, but in addition the drag of the body or fuselage formed by the converted automobile unit A, is about at a minimum.

When the flight unit F is mounted and attached on the automobile unit A to form the airplane, the flight control systems for directional, lateral or pitch control of the airplane are, in accordance with one of the features of my present invention, automatically aligned and operatively associated with the driver-pilot actuated operating controls mounted in the automobile unit A, for the flight control systems mounted on the flight unit F. This automatic alignment and operative association is effected solely and merely by the act of mounting the flight unit F and attaching the same in proper airplane forming position on the automobile unit A. This result is accomplished, as hereinbefore explained, due to the fact that when the flight unit F is mounted and attached on automobile unit A, the housing 95 on the flight unit F fits down on and aligns with the housing 96 on the automobile unit A, with the crank plates 1a, 1c and 1b, aligned with and placed in operative relation and engagement with the crank plates 2a, 2c and 2b, respectively, so that, operative rocking of a crank plate 2a, 2c and 2b by actuation of an operating control of the automobile unit A, will result in rocking or actuation of the corresponding crank plate 1a, 1c or 1b, of the respective flight control system in which such crank plates are operatively connected. Thus, with the flight unit F in mounted position on the automobile unit A to form the airplane, the pilot actuated foot pedals L are operatively connected through the crank plates 1a and 2a with the rudder 73, while the steering wheel 45 is operatively connected with the ailerons 63 through the crank plates 1b and 2b, and the horizontally swinging column or arm 47 actuated by bodily fore and aft movements of the steering wheel 45, is operatively connected to the elevator 71 through the crank plates 1c and 2c.

This arrangement of separable operating mechanism, coupling the pilot actuated operating controls on the automobile unit A with the flight control systems on the flight unit F, makes it possible to detach and remove the flight unit F from the automobile forming unit A, to convert the latter to an automobile without the necessity of any manual disconnection or other operations to separate the flight control systems on the flight unit from the operating controls therefor on the automobile forming unit, while retaining for such mechanism the highly desired certainty and positiveness of separable operative association at all times and under all conditions with the flight unit F mounted on the automobile unit A to form the airplane. In this connection it is to be noted that my invention is not intended or required to be limited to the specific design and construction of mating units or separable operating mechanisms here shown as an example, as my invention contemplates and includes the provision of any type of mating unit or separable mechanism that does not require the use of pins, bolts or other detachable coupling or connecting elements.

After the flight unit F is mounted and attached to form the airplane, the propeller P may then be quickly mounted and attached on propeller shaft V at the end thereof projecting forwardly from the front end or nose of the unit A, as will be clear by reference to Fig. 7 of the drawings in particular. If desired, or in any particular instance if found of advantage, any suitable conventional clutch mechanism (not shown) may be provided for engaging and disengaging the propeller shaft V from the engine, although it is not considered necessary to specifically disclose such a clutch mechanism in this particular instance. If such clutch mechanism is provided, any suitable manually actuated operated mechanism may be provided for actuation from the compartment 14, to engage and disengage propeller shaft V from the engine E.

In the flight operation of the airplane formed in accordance with my invention, by mounting the flight unit F on and combining the same with the automobile forming unit A, a more or less conventional arrangement of pilot acuated operating controls is provided in the compartment 14 by the rudder pedals L, and the steering wheel 45 with the horizontally rockable steering wheel carrying column or arm 47, and these broadly conventional controls for the airplane are, as described and explained hereinbefore, arranged so as not to interfere with the normal broadly conventional driver controls for the automobile unit A, consisting of the brake pedal 53b, the clutch pedal 56b and the steering wheel 45, or to displace the normal functioning of these automobile controls as such, except, for the dual use of the steering wheel 45 both as an airplane control and as an automobile control. The pilot in the driver-pilot seat 16a in compartment 14, sits with his feet on the foot pedals 89 and 91 of the pedal group L, and then has the steering wheel 45 in proper position for easy manual rotation or turning of this wheel about its axle 45a and for forward and rearward bodily movements of this wheel 45 to thereby rock or swing the depending column or arm 47 on the shaft 49 on which this arm is hung. As before pointed out any usual engine controls (not shown) are provided for the usual control of the engine E.

The pilot may, if he so desires, take off with the airplane in the usual or conventional manner, that is, solely by the use of the propeller P and without driving the rear wheels 11 from the engine E. Such conventional take off may be carried out, for example, by placing the gear shift lever 53a controlling the gear shift transmission in its neutral position. With the gear shift in neutral so that the driving wheels 11 are disengaged from the engine E, the pilot then opens the engine throttle in the usual manner to drive the propeller P to propel the airplane on its take off run. During the take off run the airplane remains in its normal ground attitude and due to the relationship between the angle of incidence of the opposite wings 60 with the airplane in normal ground attitude, a sufficient lift is developed by the wings to enable the airplane to take off without bodily raising the forward or nose end of the airplane in order to increase the angle of attack of the wing.

However, in accordance with one of the features of my invention, which results from the arrangement and mounting of the engine E and the separate drive mechanism therefrom to the driving wheels 11 of the unit A and to the propeller P, the driving wheels 11 may be efficiently utilized to assist in the take off of the airplane and thereby shorten the distance of the take off run required. This type of take off is carried out by leaving the rear driving wheels 11 with the engine E, in normal automobile driving relation so that as the power is increasingly applied from the engine E to drive the propeller P for take off, the rear wheels 11 are simultaneously driven, and being in traction or driving engagement with the ground surface, these driving wheels will materially increase the forward propulsive power applied to the airplane during the take off run and thus accelerate and increase the speed of take off. After the airplane has taken off and is in flight, the pilot may then disengage the driving wheels from the motor by operation of the clutch pedal 53b, and the gear shift lever 53a, to place the transmission in neutral position. In flight, the airplane is controlled broadly in the conventional manner, through the actuation of the operating controls on the automobile unit A, to operate the flight control systems, including the aerodynamic control surfaces thereof, on the flight unit F. Directional flight control is effected by selective operation of the pedals 89 and 91 by the pilot, the right pedal being pushed forward and downward to effect operation of the vertical rudder 73 to direct or turn the airplane to the right, while forward and downward movement of the left pedal 89 swings the rudder 73 to the left to direct or turn the airplane to the left. Roll or lateral control is effected by turning the steering wheel 45, so as to differentially vertically displace the opposite ailerons 63 to roll the airplane to the right or to the left corresponding to the direction in which wheel 45 is turned. Pitch or vertical flight control of the airplane is effected by bodily moving the steering wheel 45 and its supporting arm unit 46—47, forwardly or rearwardly to thereby displace the elevator 71 downwardly or upwardly, respectively.

As hereinbefore referred to and explained, the opposite ailerons 63 may also be operated to function as wing lift capacity varying flaps, by simultaneously, vertically displacing these ailerons in the same direction, upwardly or downwardly. This operation of the ailerons 63 is effected by manual actuation by the pilot, of the lever 78. Such operation of the aileron 63, is as is well understood in this art, primarily useful in landing the airplane to reduce landing speed and to act as air or aerodynamic brakes to thereby reduce the landing run. As has been pointed out herein, the opposite ailerons 63 are differentially operable to establish rolling moments for roll or lateral control in any position to which the ailerons may be adjusted simultaneously, upwardly or downwardly, by actuation of the flap control lever 78.

In landing, the airplane is placed in substantially normal ground attitude, and in the particular example hereof, the landing operation and the action and control of the airplane in the landing run, are particularly aided by the directionally stable type of landing gear provided by the castering forward wheel 10 forward of the center of gravity, and the directionally fixed and laterally spaced rear landing wheel 11 located substantially to the rear of the center of gravity. After landing, if desired, the ground maneuvering of the airplane may be accomplished by engaging the rear driving wheels 11 with the engine E and solely propelling the airplane by such driving wheels, in which event the use of a clutch mechanism heretofore referred to but not shown herein, for disengaging the propeller shaft V from the engine E may be utilized to advantage. But if preferred, the ground handling may be effected in the conventional airplane manner by propelling the airplane on the ground through the medium of the propeller P, leaving the driving wheels 11 disengaged from the engine E.

It is recognized that, if necessary or found desirable, the control surfaces may be provided with so-called flight tabs for trim, but as the use of such tabs is familiar in the art and as the installation of any such trim tabs may be similar to the installations as conventionally employed or used for airplanes, it is not deemed necessary to show such tabs or any installation thereof herein.

The airplane may at any time be converted to form an automobile for road operation and use, by detaching and removing the flight unit F, and if desired, the propeller P, such removal of the flight unit being accomplished by merely unlocking and removing the locking pins M, and then lifting the flight unit F from its mounted position, no operations of any kind being required to separate or disengage the operative association between the flight control systems on the flight unit F, and the operating controls therefor on the automobile forming unit A. With the flight unit F and propeller P removed, the unit A then provides a complete, self-contained and ready-to-operate automobile or car of the conventional automobile type, as described and explained hereinbefore.

If desired, when the unit A has been converted to form automobile, the steering wheel carrying arm 47 may be releasably locked in position to prevent movement of the steering wheel 45 bodily forwardly and rearwardly with the arm 47. Referring now to Fig. 26 of the drawings, one possible locking arrangement is disclosed and embodies a crank or horn 152 which may be fixed to crank 87 and/or to the shaft 49 in position extending upwardly therefrom over an ear or lug 153 secured to and between the upper ends of the truss members 21 and 22. The crank 152 is formed with a transverse bore 152a therethrough adjacent its upper end for alignment with a bore through the lug 153 when the arm 47 is in vertically disposed position to locate steering wheel 45 in the desired position for operation as the steering wheel of the automobile unit. With the bore 152a of crank 152 aligned with the bore through lug 153, a suitable locking pin may be removably inserted therethrough to thus lock crank 152 and arm 47 against swinging. For example one of the releasable locking pins M hereinbefore described may if desired be employed for this purpose.

It is also evident that various other designs, forms, types and arrangements, constructions and combinations may be resorted to without departing from the spirit and scope of my present invention, and hence I do not wish to limit my invention in all respects to the exact and specific disclosures hereof.

Desiring to claim my invention in the broadest manner legally possible, what I claim is:

1. In combination, an automobile unit, and a flight unit for removable mounting on said automobile unit to form an airplane therewith, said automobile unit including a running gear and a body frame structure thereon, said flight unit including opposite wing structures spaced apart at the inner root ends thereof, spaced outrigger booms having the forward portions thereof located at and secured along and disposed chordwise of the root ends, respectively, of said opposite wings, said outrigger booms being extended rearwardly from said wings, a tail group mounted on said outrigger booms to the rear of said wing structures, said flight unit being removably mounted on and attached to said automobile unit in position with the wing root located forward portions of said spaced outrigger booms attached to and along the opposite upper sides, respectively, of said body frame structure with said wings extended from opposite sides of and with said outrigger booms extended rearwardly from, said automobile unit, and means for removably attaching said outrigger booms to said body frame structure to removably mount said flight unit in position on said automobile unit.

2. In combination, an automobile unit, and a flight unit for detachable mounting on said automobile unit to form an airplane therewith, said automobile unit including a running gear and a body structure thereon, said flight unit including opposite wings spaced apart at the inner root ends thereof, each of said wings being provided with a longitudinal wing spar and said opposite wing spars being connected and extending across and between the spaced root ends of said wings, spaced outrigger booms having the forward portions thereof located at and secured along the spaced root ends, respectively, of said opposite wings and being extended rearwardly therefrom, a tail group mounted on said outrigger booms to the rear of said wings, said flight unit being removably mounted and supported on said automobile unit in position with the wing root located forward portions of said outrigger booms located along opposite upper sides of the body structure and with the opposite wings extending from opposite sides, respectively, of said body structure, means for detachably securing the wing root located forward portions of said outrigger booms to the adjacent portions, respectively, of the opposite upper sides of said body structure, and means for detachably securing the wing spar extending between the root ends of said opposite wings to adjacent portions of the body structure of said automobile unit.

3. In combination, an automobile unit, and a flight unit for detachable mounting on said automobile unit to form therewith an airplane, said automobile unit including a running gear and a body structure thereon, said flight unit including opposite wings spaced apart at the inner root ends thereof, each of said wings being provided with a wing spar disposed spanwise thereof, said opposite wing spars being connected and extending across and between the spaced root ends of said wings, spaced outrigger booms located at and secured to and along the spaced root ends, respectively, of said opposite wings, said spaced outrigger booms being extended rearwardly from said wings, a tail group mounted on said outrigger booms to the rear of said wings, said flight unit being removably mounted on said automobile unit in position with said spaced outrigger booms located at the upper side of said body structure along the opposite sides thereof, respectively, and with the section of the wing spar extending across and between the spaced root ends of said wings being also located at the upper side and extending transversely across said body frame structure, and means detachably securing the portions of said outrigger booms located along the root ends of said spaced wings and the wing spar extended between the wing root ends, to adjacent portions, respectively, of said body structure at the upper side thereof.

4. In combination, an automobile unit and a flight unit for removable mounting on said automobile unit to form therewith an airplane, said automobile unit including a running gear and a body structure thereon, said flight unit including a wing structure providing opposite wings, spaced outrigger booms extending chordwise across and being secured to the central portion of said wing structure, said spaced outrigger booms being extended rearwardly from said wing structure, a tail group mounted on said outrigger booms to the rear of said wing structure, the forward portions of said outrigger booms which extend chordwise across the wing structure being spaced apart a distance approximately equal to the distance of the spacing between the opposite upper side portions of said body frame structure, said wing structure being removably mounted and supported on and across the upper side of said body frame structure in position with the wing structure attached forward portions of said spaced outrigger booms located along and adjacent the upper side portions, respectively, of said body frame structure, and means for detachably securing said forward portions of said outrigger booms to the adjacent opposite upper side portions, respectively, of said body frame structure to removably mount and secure said flight unit to said automobile unit.

5. In combination, an automobile unit and a flight unit for removable mounting on said automobile unit to form therewith an airplane, said automobile unit including a running gear and a body structure thereon, said flight unit including a wing structure providing opposite wings, spaced outrigger booms extending chordwise across and being secured to the central section of said wing structure, said spaced outrigger booms being extended rearwardly a distance from said wing structure, a tail group mounted on said outrigger booms to the rear of said wing structure, said wing structure being removably mounted on and extending across the upper side of said body frame structure in position thereon with the forward portions of said outrigger booms secured to said wing structure being located extended along and secured to the opposite upper side portions, respectively, of said body frame structure, and means for detachably securing the said forward portions of said outrigger booms directly to adjacent opposite upper side portions, respectively, of said body frame structure to removably mount said wing structure on said body frame structure.

6. In combination, an automobile unit, and a flight unit for detachable mounting on said automobile unit to form therewith an airplane, said automobile unit including a running gear and a body embodying upwardly extended opposite side wall forming structures having attachment fittings secured thereto at the upper sides thereof, respectively, said flight unit including a wing structure providing opposite wings and spaced outrigger booms having the forward lengths thereof disposed chordwise across, secured to and being extended rearwardly from the intermediate section of said wing structure, a tail group mounted on said outrigger booms to the rear of said wing structure, the forward lengths of said outrigger booms being provided with attachment fittings for operative engagement with the attachment fittings, respectively, at the upper sides of said opposite side wall forming structures of said body, said flight unit being removably mounted and supported on said automobile unit by detachably engaging the said fittings of said body with said fittings, respectively, on the forward lengths of said outrigger booms, and means for detachably locking said engaged fittings, respectively, to secure the flight unit in airplane forming position on and with said automobile unit.

7. In combination, in a convertible automobile-airplane, an automobile unit and a flight unit adapted to be removably mounted on said automobile unit to form therewith an airplane, said flight unit including control surfaces movably mounted thereon and operating systems for actuating said control surfaces, respectively, said automobile unit including pilot controlled mechanism mounted thereon for selectively operating the control surface actuating systems of said flight unit when the latter unit is mounted in airplane forming position on said automobile unit, said pilot controlled mechanism including actuating crank members movably mounted on said automobile unit, each of said crank members providing abutment surfaces thereon disposed generally transversely to the path of movement of said crank member, said control surface actuating systems on said flight unit including actuated crank members movably mounted on said flight unit, said flight unit mounted actuated crank members providing abutment surfaces for engagement with the abutment surfaces of said actuating crank members on said automobile unit to form the sole operative connection between said crank members for transmitting motion of the actuating members to said flight unit mounted actuated members with the flight unit mounted on said automobile unit, and said actuated crank members on said flight unit and said actuating crank members on said automobile unit being mounted and positioned to be automatically aligned and completely engaged solely by the act of mounting the flight unit on the automobile unit and to be automatically completely disengaged and separated solely by the act of removing the flight unit from said automobile unit.

8. In combination, in a convertible automobile-airplane, an automobile unit and a flight unit for removable mounting on said automobile unit to form therewith an airplane, said flight unit including movable control surfaces thereon, operating systems on the flight unit for actuating said control surfaces, respectively, pilot controlled actuating systems mounted in said automobile unit for operative association with the operating systems on said flight unit for actuating said movable control surfaces when the flight unit is in mounted position on the automobile unit, a movable crank member in each control surface actuating system on the flight unit for actuation to operate such system, a movable crank member in each pilot controlled actuating system on the automobile unit for actuation by such system, the crank members of the controlled surface operating systems on said flight unit and the crank members of the pilot controlled operating systems on said automobile unit each being provided with an abutment surface, said crank members of the flight unit control surface operating systems with the flight unit mounted on said automobile unit being positioned in alignment with the crank members, respectively, of said pilot controlled operating systems of the automobile unit with the abutment surfaces of said aligned crank members engaged to form the sole operating connection between said engaged crank members, and said automobile mounted crank members and said flight unit mounted crank members being automatically aligned and completely operatively engaged solely by the act of mounting said flight unit on said automobile unit and being automatically completely disengaged and separated solely by the act of removing the flight unit from the automobile unit.

9. In combination, in a convertible automobile-airplane, an automobile unit, a flight unit for removable mounting in position on and across the upper side of said automobile unit to form therewith an airplane, said flight unit including movable control surfaces, operating systems on said flight unit for actuating said control surfaces, respectively, pilot controlled operating systems on said automobile unit for operative association with the control surface actuating systems, respectively, on said flight unit, each pilot controlled operating system on the automobile unit including a horizontally disposed crank member mounted for vertical rocking about an axis intermediate the ends of said member for actuation by said operating system, said vertically rockable crank members being mounted and located at the upper side of said automobile unit and each being provided at the upper side thereof with abutment surfaces at opposite sides of the axis of said member, each of said control surface operating systems on the flight unit including a horizontally disposed crank member mounted for vertical rocking about an axis intermediate the ends of said member for actuation to operate the system in which connected, said crank members of said control surface operating systems being mounted on the flight unit in position exposed at the under side thereof and each being provided with abutment surfaces at the under side thereof at oppostie sides of the axis of said member for engagement by the abutment surfaces, respectively, at the upper sides of said vertically rockable crank members on said automobile unit when the flight unit is mounted in airplane forming position on said automobile unit.

10. In combination, in a convertible automobile-airplane, an automobile unit and a flight unit for removable mounting on said automobile unit to form therewith an airplane, said flight unit including movable control surfaces thereon, operating systems on the flight unit for selectively actuating said control surfaces, respectively, pilot controlled actuating systems mounted on said automobile unit for operative association with the operating systems on said flight unit for actuating said movable control surfaces when the flight unit is in mounted position on the automobile unit, a crank member in each control surface actuating system on the flight unit for operation to operate such system, each of said crank members being mounted for rocking about an axis intermediate the ends of said member and each being provided with abutment surfaces on one side thereof at opposite sides of said axis, a crank member in each pilot controlled actuating system on the automobile unit for operation by such system, each of said pilot controlled system crank members being mounted for rocking about an axis intermediate the ends of the member and each being provided with abutment surfaces on one side thereof at opposite sides of said axis, said crank members of the flight unit control surface operating systems when the flight unit is mounted on said automobile unit being positioned thereon to align with the crank members, respectively, of said pilot controlled operating systems of the automobile unit with the abutment surfaces of said aligned crank members engaged to form the sole operating connection between said engaged crank members, and said automobile unit mounted crank members and said flight unit mounted crank members being automatically aligned and completely operatively engaged solely by the act of mounting said flight unit on said automobile unit, and being automatically completely disengaged and separated solely by the act of removing the flight unit from said automobile unit.

11. In combination, in a convertible automobile-airplane, an automobile unit and a flight unit for removable mounting on said automobile unit to form therewith an airplane, said flight unit including control surface operating systems thereon, a movable motion transmitting member in each control surface operating system on said flight unit for actuation to operate such system, pilot controlled actuating systems mounted in said automobile unit for operative association with the operating systems on said flight unit, a movable motion transmitting member in each pilot controlled actuating system on the automobile unit for actuation by such system, the movable members of the control operating systems on said flight unit and the movable members of the pilot controlled actuating systems on said automobile unit each being provided with an abutment surface, said movable members of the flight unit control operating systems with the flight unit mounted on said automobile unit being positioned thereon to align with the movable members, respectively, of said pilot controlled actuating systems of the automobile unit with the abutment surfaces of said aligned crank members engaged to form the sole operating connection between said engaged members, and means associated with the movable members of said control operating systems for actuating said members when the flight unit is removed from the automobile unit to automatically operate said control systems to and to maintain the same in neutral control positions.

12. In combination, in a convertible automobile-airplane, an automobile unit and a flight unit for removable mounting on said automobile unit to form therewith an airplane, said flight unit including control operating systems, respectively, on said flight unit, a movable motion transmitting member in each control operating system on said flight unit for actuation to operate such system, pilot controlled actuation systems mounted in said automobile unit for operative association with the control operating systems, respectively, on said flight unit, a movable motion transmitting member in each pilot controlled actuating system on the automobile unit for actuation by such system, the movable members of the control operating systems on said flight unit and the movable members of the pilot controlled actuating systems on said automobile unit each being provided with an abutment surface, said movable members of the flight unit control operating systems with the flight unit mounted on said automobile unit being positioned thereon to align with the movable members, respectively, of said pilot controlled actuating systems of the automobile unit with the abutment surfaces of said aligned crank members engaged to form the sole operating connection between said engaged members, mechanism for actuating said movable members of the control operating systems on said flight unit to actuate said systems to and to maintain the same in neutral control positions when the flight unit is removed from said automobile unit, and means on said automobile unit for operatively engaging said mechanism when the flight unit is mounted on said automobile unit to cause said mechanism to release said movable members of said control operating systems for operation thereof by said pilot controlled operating systems of the automobile unit.

13. In combination, in a convertible automobile-airplane, an automobile unit and a flight unit for removable mounting on said automobile unit to form therewith an airplane, said flight unit including control surface operating systems thereon, a movable motion transmitting member in each control surface operating system on said flight unit for actuation to operate such system, pilot controlled actuating systems mounted on said automobile unit for operative association with the control surface operating systems on said flight unit, a movable motion transmitting member in each pilot controlled actuating system on the automobile unit for actuation by such system, the movable members of the control surface operating systems on said flight unit and the movable members of the pilot controlled actuating systems on said automobile unit each being provided with an abutment surface, said movable members of the flight unit control operating systems being positioned thereon to align with the movable members, respectively, of said pilot controlled actuating systems of the automobile unit when the flight unit is mounted on the automobile unit with the abutment surfaces of said aligned members engaged in separable contact abutment to form the sole operating connection between said engaged members, and the abutment surface of one of each of said aligned members being provided by an element yieldingly urged toward the other thereof and the abutment surface of said other member being provided by a rotary element for minimum friction engagement with said yielding element.

14. In combination, an automobile unit; a flight unit for detachable mounting on said automobile unit to form therewith an airplane; said automobile unit including a body structure and a running gear thereon; said flight unit including opposite wings, an outrigger structure including, spaced outrigger booms having the forward end portions thereof extended forwardly across said wings, said outrigger booms being extended rearwardly from said wings, and a tail group mounted on said outrigger booms spaced to the rear of said wings; the forward end portions of the outrigger booms of said outrigger structure being removably attached to the adjacent upper portions, respectively, of said body structure to mount and support said flight unit in airplane forming position on and with said automobile unit; and means for removably attaching the forward portions of said spaced outrigger booms to the said body structure of the automobile unit.

15. In combination, in a convertible automobile-airplane; a complete self-contained roadable automobile unit; a complete self-contained controllable flight unit for removable mounting on said automobile unit to form therewith an airplane and for removal and complete detachment therefrom; means including interengaging members on said units for detachably mounting the flight unit on the automobile unit; said automobile unit including as self-contained components thereof, a running gear having steerable and power driven ground engaging wheels, an engine mounted in said automobile unit, a power transmission from said engine to said driven wheels, operator controls for said engine, operator controls for said transmission, an operator controlled steering mechanism for said steerable ground engaging wheels; said flight unit including as self-contained components thereof, a movable control surface, and an operating system for actuating said surface; said automobile unit including also as a self-contained component thereof, a pilot controlled mechanism; motion transmitting mechanism for operatively connecting the pilot controlled mechanism on said automobile unit with said control surface actuating system on said flight unit, said motion transmitting mechanism including a member mounted on said automobile unit as a self-contained component thereof for selective movement by said pilot controlled mechanism, said member being provided with an exposed abutment surface, a member movably mounted on said flight unit as a self-contained component thereof and being connected with said control surface actuating system for transmitting movements imparted thereto by said automobile unit mounted member to said control surface operating system, said flight unit mounted member having an exposed abutment surface for compression contact solely against the exposed abutment surface of said automobile unit mounted member, and said automobile unit mounted and flight unit mounted members of said motion transmitting mechanism being located on and relative to their respective units and to each other, to be automatically positioned with the exposed abutment surfaces thereof in operative compression contact and to be automatically completely disengaged to separate the exposed abutment surfaces thereof from pressure contact, solely by the acts of mounting said flight unit in position on said automobile unit and of removing said flight unit from mounted position on said automobile unit, respectively.

16. The combination, in a convertible automobile airplane, of a complete self-contained roadable automobile unit and a complete self-contained flight unit for removable mounting on said automobile unit to form therewith an airplane; means for removably mounting said flight unit on said automobile unit and being operable to effect complete detachment and separation of said self-contained automobile and flight units; said automobile unit including, a running gear having steerable and power driven ground engaging wheels, an engine, a power transmission from said engine to said power driven wheels, operator controls for said engine and for said power transmission, respectively, and operator controlled steering mechanism for said steerable ground engaging wheels; said flight unit including, control surfaces movably mounted thereon, operating systems for actuating said control surfaces, respectively; said automobile unit including, pilot controlled mechanism for selectively operating the control surface actuating systems, respectively, on said flight unit when the flight unit is mounted on said automobile unit; separable motion transmitting mechanism for automatically operatively associating the pilot controlled mechanism on said automobile unit with said control surface operating systems on said flight unit; said separable motion transmitting mechanism embodying sets of motion transmitting members, each of said members being formed of complementary sections with one section thereof mounted on the flight unit and the other section mounted on the automobile unit, the separable sections of each motion transmitting member being provided with exposed abutment surfaces, respectively, adapted to be engaged solely by separable compression contact therebetween and forming by such contacts the sole operating connection between the sections for transmitting motion from the pilot control mechanism on the automobile unit to a control surface actuating system on the flight unit when the latter unit is in mounted position on the automobile unit, and said separable sections being mounted on and relative to the automobile and flight units, respectively, and relative to each other to be automatically positioned to contact the exposed abutment surfaces thereof, respectively, solely by the act of mounting said flight unit on said automobile unit and being automatically completely separated from pressure contact with each other solely by the act of removing said flight unit from said automobile unit.

17. A convertible automobile-airplane comprising, in combination, a complete self-contained roadable automobile unit; a complete self-contained flight unit adapted to be removably mounted in position on and across the upper side of said automobile unit to form therewith an airplane, means including interengaging members on said units for detachably mounting the flight unit in position on the automobile unit and being operable to effect complete detachment and separation of said units; said automobile unit including a running gear having steerable and power driven ground engaging wheels, an engine, a power transmission from said engine to said power driven wheels, operator controls for said engine and for said power transmission, respectively, and operator controlled steering mechanism for said steerable ground engaging wheels; said flight unit including, control surfaces movably mounted thereon, operating systems on said flight unit for actuating said control surfaces, pilot controlled operating systems on said automobile unit for operative association with the actuating systems, respectively, on said flight unit; each pilot controlled operating system on the automobile unit, including a vertically movable motion transmitting member for operation by such system, said members of said pilot controlled operating systems being mounted and located at the upper side of the automobile unit and each being provided at the upper side thereof with an exposed abutment surface; each of said control surface operating systems on the flight unit including, a vertically movable motion transmitting member for actuation to operate the system in which connected, said vertically movable members of said control surface operating systems being mounted on the flight unit in position exposed at the under side thereof and each being provided at its under side with an exposed abutment surface for separable pressure contact solely by the exposed abutment surfaces, respectively, at the upper side of said vertically movable members on said automobile unit; and said vertically movable members on said flight unit and said vertically movable members on said automobile unit being so located relative to such units and to each other as to be automatically completely engaged in separable pressure contact solely by the act of mounting said flight unit in position on said automobile unit and being completely disengaged and separated from pressure contact solely by the act of removing said flight unit from said automobile unit.

18. A convertible automobile-airplane including, a complete self-contained roadable automobile unit having therein a manually movable device; a complete self-contained flight unit detachable and completely separable therefrom as a unit and having an element to be moved upon movement of said device; means for detachably connecting said automobile and flight units; a connection between said device and said element to transmit operating forces therebetween; said connection including a pair of cables attached to said device to be alternately moved thereby upon reversed manual operation of said device; structure providing a pair of separable compression contact members mounted for movement in said automobile unit at its meeting zone with said flight unit; said compression contact members having an operative association with the respective cables so that the one moves in the opposite direction from the other; structure providing another pair of separable compression contact members mounted for movement in the flight unit in position to cooperate with said first pair of compression contact members when said units are interlocked together; another pair of cables, said second pair of compression contact members having an operative association with said second pair of cables so that the one moves in the opposite direction from the other; the first pair of compression contact members being withdrawable from contact with said other pair of pressure members solely by the act of separating said flight unit from said automobile unit; and said cooperating compression contact members serving to transmit force therebetween to cause simultaneous movement of said device and said element.

19. A convertible automobile-airplane including, in combination, a complete self-contained roadable automobile unit; a complete self-contained flight unit detachable and completely separable as a unit from said automobile unit; means for detachably connecting said automobile and flight units to form the convertible automobile-airplane; said flight unit including as self-contained components thereof, a control surface movably mounted thereon, and an operating system for selectively actuating said control surface; said operating system including, a pair of abutment members mounted for movements in opposite directions, each of said members providing contact surfaces for solely compression contact, and operative connections between said members and said control surfaces for causing movements simultaneously of one member in a direction opposite to the direction of movement of the other member; said automobile unit including as a self-contained component thereof, a pilot controlled mechanism mounted thereon for operating the abutment members of the control surface actuating system of said flight unit when the latter unit is mounted in airplane forming position on said automobile unit; said pilot controlled mechanism including, an operating element, spaced abutment members each providing surfaces for solely compression contact, and connections between said abutment members and said operating element for causing movement simultaneously of one abutment member in a direction opposite the direction of movement of the other abutment member; and the abutment members of said control surface actuating system on the flight unit and the abutment members of said pilot control mechanism on the automobile unit being mounted and positioned relative to their respective units and to each other to automatically align and place in separable movement transmitting compression contact solely the contact surfaces, respectively, of said abutment members, solely by the act of mounting the flight unit on the automobile unit; and said abutment members being automatically separated from operative movement transmitting compression contact solely by the act of detaching and completely separating the flight unit from said automobile unit.

THEODORE P. HALL.

REFERENCES CITED

The following references are of record in the file of this patent:

UNITED STATES PATENTS

| Number | Name | Date |
| --- | --- | --- |
| 1,431,520 | Hall | Oct. 10, 1922 |
| 1,579,656 | Harpstrite | Apr. 6, 1926 |
| 1,627,184 | Krammer | May 3, 1927 |
| 1,674,338 | Moore | June 19, 1928 |
| 1,708,373 | Meymouth | Apr. 9, 1929 |
| 1,720,421 | Laudy | July 9, 1929 |
| 1,762,657 | Francesconi et al. | June 10, 1930 |
| 1,817,651 | Schroeder | Aug. 4, 1931 |
| 2,001,260 | Martin | May 14, 1935 |
| 2,146,800 | Beeson | Feb. 14, 1939 |
| 2,156,288 | Holliday | May 2, 1939 |
| 2,174,946 | Ray et al. | Oct. 3, 1939 |
| 2,181,574 | Burnelli | Nov. 28, 1939 |
| 2,194,596 | Henter | Mar. 26, 1940 |
| 2,215,003 | Johnson | Sept. 17, 1940 |
| 2,241,577 | Beals | May 13, 1941 |
| 2,373,467 | Frakes | Apr. 10, 1945 |
| 2,430,869 | Fulton | Nov. 18, 1947 |

FOREIGN PATENTS

| Number | Country | Date |
| --- | --- | --- |
| 23,645 | Great Britain | of 1910 |
| 326,082 | Great Britain | Mar. 6, 1930 |